(12) United States Patent
Huang et al.

(10) Patent No.: US 6,766,056 B1
(45) Date of Patent: Jul. 20, 2004

(54) IMAGE PATTERN DETECTION METHOD AND APPARATUS

(75) Inventors: Kai Huang, Cecil Hills (AU); Yu-Ling Chen, Epping (AU); Peter Leslie Bell, Normanhurst (AU); Michael John Webb, West Denistone (AU); Yoong-Chert Foo, Villeneuve Loubet Cedex (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/451,441

(22) Filed: Nov. 30, 1999

(30) Foreign Application Priority Data

| Nov. 30, 1998 | (AU) | PP7430 |
| Nov. 30, 1998 | (AU) | PP7431 |
| Nov. 30, 1998 | (AU) | PP7432 |
| Nov. 30, 1998 | (AU) | PP7433 |

(51) Int. Cl.[7] .................................................. G06K 9/46
(52) U.S. Cl. ...................... 382/190; 358/453; 358/538; 380/51; 382/165; 382/209; 382/282; 382/288
(58) Field of Search ................................ 382/190, 276, 382/266, 302, 165, 209, 282, 288; 380/51; 358/453, 538

(56) References Cited

U.S. PATENT DOCUMENTS

| 5,825,892 A | * 10/1998 | Braudaway et al. ......... 380/51 |
| 5,848,155 A | * 12/1998 | Cox ........................... 382/191 |
| 5,875,040 A | * 2/1999 | Matraszek et al. ......... 358/453 |
| 5,901,245 A | 5/1999 | Warnick et al. ............ 382/190 |
| 6,411,392 B1 | * 6/2002 | Bender et al. ............. 358/1.14 |

FOREIGN PATENT DOCUMENTS

| EP | 0744705 | 11/1996 | ............ G06K/9/64 |
| JP | 10-180989 | 12/1996 | |
| JP | 9-329527 | 12/1997 | |

* cited by examiner

*Primary Examiner*—Bhavesh M. Mehta
*Assistant Examiner*—Gregory Desire
(74) *Attorney, Agent, or Firm*—Fitzpatrick, Cella, Harper & Scinto

(57) ABSTRACT

Disclosed is method of detecting a predetermined mark (30) forming part of an image. A digitized form (48, 49) of the image (21) comprising a plurality of picture elements is provided and within a current region of the image a set of features is determined. The features typically comprise a dominant color feature (44) within the current region; and at least one moment feature (111) based on picture elements pertaining to the predetermined mark within the current region. Each determined feature is compared (113) with a corresponding predetermined feature (114) of the predetermined mark. Using the comparison, a confidence level for a detection of said predetermined mark within the current region calculated. Based on the confidence level, whether or not said predetermined mark is detected in the current region can then be determined. Adjunct to the above method, also disclosed are methods for providing multiple encoded representations (40) of the image, detecting a center location (108, 160) of a predetermined pattern in the image, and determining (170, 171) a moment feature of a portion of the image.

15 Claims, 15 Drawing Sheets

IMAGE PATTERN DETECTION METHOD AND APPARATUS

FIELD OF THE INVENTION

The present invention relates to the field of image processing and, in particular, to where image processing techniques are used to detect a predefined pattern in the input image.

BACKGROUND ART

The accurate detection of marks or other indicia in documents is important in the prevention of fraud and disreputable handling of such documents. Specifically, with the introduction of high quality colour photocopying, the simple copying of banknotes has presented an immediate need for arrangements to prevent such reproductions. Whilst watermarking and holography have been used in some currencies with relative success, not all banknotes or other valuable instruments (e.g. stock certificates, bonds etc) are similarly protected.

European Patent Publication No. EP 0 744 705 A2 discloses an image detection system that stores templates of image portions and compares those templates against regions of the image a various rotations.

SUMMARY OF THE INVENTION

In accordance with a first aspect of the present invention there is provided a method of detecting a predetermined mark forming part of an image, the method comprising the steps of:

(a) providing a digitized form of the image comprising a plurality of picture elements;

(b) determining within a current region of said image a set of features comprising at least:
  (i) a dominant colour feature within the current region; and
  (ii) at least one moment feature based on picture elements pertaining to the predetermined mark within the current region; and (c) comparing each determined feature with a corresponding predetermined feature of said predetermined mark;

(d) calculating, using the comparison, a confidence level for a detection of said predetermined mark within said current region; and (e) determining, based on the confidence level, whether or not said predetermined mark is detected in the current region.

In accordance with another aspect of the present invention there is provided a method of providing multiple encoded representations of an image, said image comprising a plurality of pixels, each pixel being represented in multiple colour channels, said method comprising step of:

providing a plurality of pixels of said image data in a predetermined order;

determining a dynamic threshold value based on the provides pixel values;

thresholding each pixel of against said dynamically determined threshold to determine whether each said pixel is a foreground or a background pixel and outputting an encoded representation comprising either:

a) a background code symbol if the pixel is a background pixel; or b) a colour code symbol representing a colour value of the pixel if the pixel is a foreground pixel;

producing a binary bitmap representation at a first desired resolution from said encoded representation the image; and subsampling said encoded representation in accordance with said background and colour code symbols of the encoded representation to provide a second desired resolution of the encoded representation of the image.

In accordance with another aspect of the present invention there is provided a method for detecting a centre location of a predetermined pattern in an image, said method comprising the steps of:

(a) examining a plurality of pixel values at predetermined pixel locations within said image, said examined locations being determined by a plurality of groups comprising multiple locations in each group and said groups being configured into a predetermined geometric arrangement having a corresponding geometric centre location;

(b) determining an evidence value for each said group of examined pixel values;

(c) determining a deviation measure value from the evidence values of substantially all said groups of said geometric arrangement; and (d) thresholding the deviation measure value against a predetermined threshold value and outputting either:
  (i) a centre value, indicating a pixel location corresponding to the centre location, if the deviation value for each group is below the predetermined threshold value; or
  (ii) an invalid value otherwise.

In accordance with another aspect of the present invention there is provided a method of determining a moment feature of a portion of an image, said image portion comprising a plurality of pixel values, said method comprising the steps of:

storing a predetermined subset of coefficient values of a moment matrix, said moment matrix having a predetermined symmetry and said subset being those coefficient values which exploit at least part of said symmetry;

combining pixel values at selected pixel locations in said image portion to provide a combined result, wherein said selected locations are associated with a respective coefficient value of said subset;

multiplying each combined result with a corresponding coefficient value; and accumulating each multiplied combined result to determine a moment feature for said image portion.

Other aspects of the present invention including apparatus and computer program products for performing the methods are also disclosed.

BRIEF DESCRIPTION OF THE DRAWINGS

Notwithstanding any other forms which may fall within the scope of the present invention, preferred forms of the invention will now be described, by way of example only, with reference to the accompanying drawings which.

DETAILED DESCRIPTION

Figure 1:
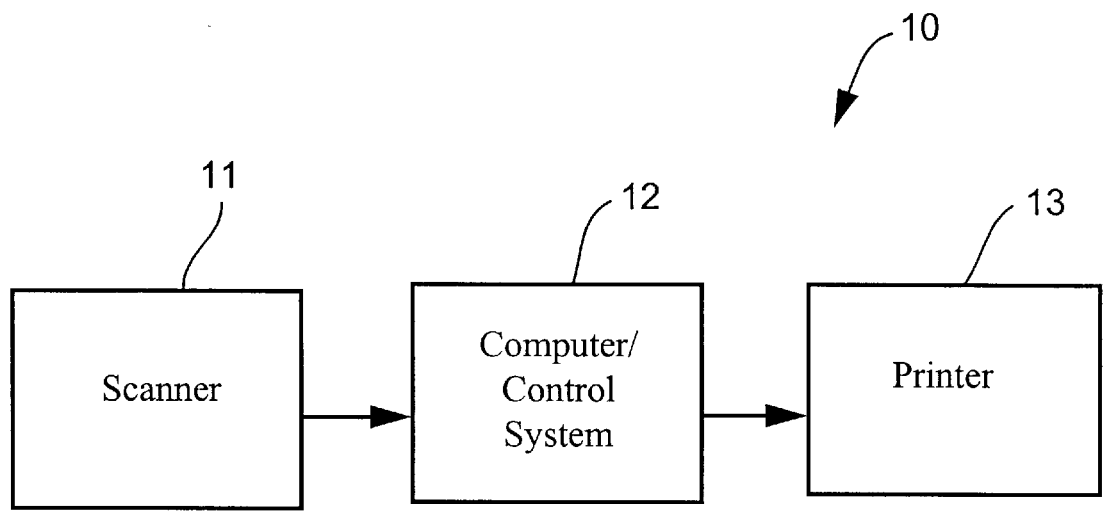
FIG. 1 shows a block diagram of an image reproduction system.

Throughout the drawings, unless specified to the contrary, the same reference numeral is used to indicate substantially the same item.

Overview

Referring to FIG. 1, there is shown an example of a reproduction system 10 upon which the preferred embodiment of the present invention can be implemented. The reproduction system 10 comprises a scanner device 11 preferably capable of digitally scanning an image to a very high resolution, for example 600 dots per inch (dpi), a computer control system 12, and a printer device 13 for a colour hard copy reproduction of the scanned in image. Examples of such reproduction systems include colour photocopying machines such as the Canon Colour Laser Copier sold by Canon Inc. of Japan, and general purpose computer systems connected to a scanner device and printer device in the typical manner in which such devices are connected to computer systems. Preferred embodiments of the present invention are formed by hardware incorporated into input devices, such as image scanners, output devices, such as colour printers, or combined devices having a scanner and printer such as a photocopiers. However, software implementations are possible without departing from the scope and spirit of the present invention.

The image scanned in at the scanner 11 is fed, typically on a pixel-by-pixel basis, to the computer control system 12 which is able to manipulate the scanned image, for instance, by providing filtering, scaling or transforming functions. The resultant pixel image can be fed to a printer 13, again on a pixel-by-pixel basis, where it is printed on a recording medium, such as paper. The scanned image from the scanner 11, normally is formed of separate colour channel information for each red, green and blue (R,G,B) colour portions of the scanned image, which is commonly known as an additive colour format. The printer 13 generally prints out the scanned image by a four pass subtractive colour process. The four pass printing process typically consists of separate passes of Cyan, Magenta, Yellow and Black (CMYK) portions of the image. As the printer 13 normally operates on a four pass process, and the image scanner 11 can, typically, on a single scan obtain the RGB colour portions a conversion process is applied to convert from one colour space (RGB) to another (CMYK).

Figure 2:
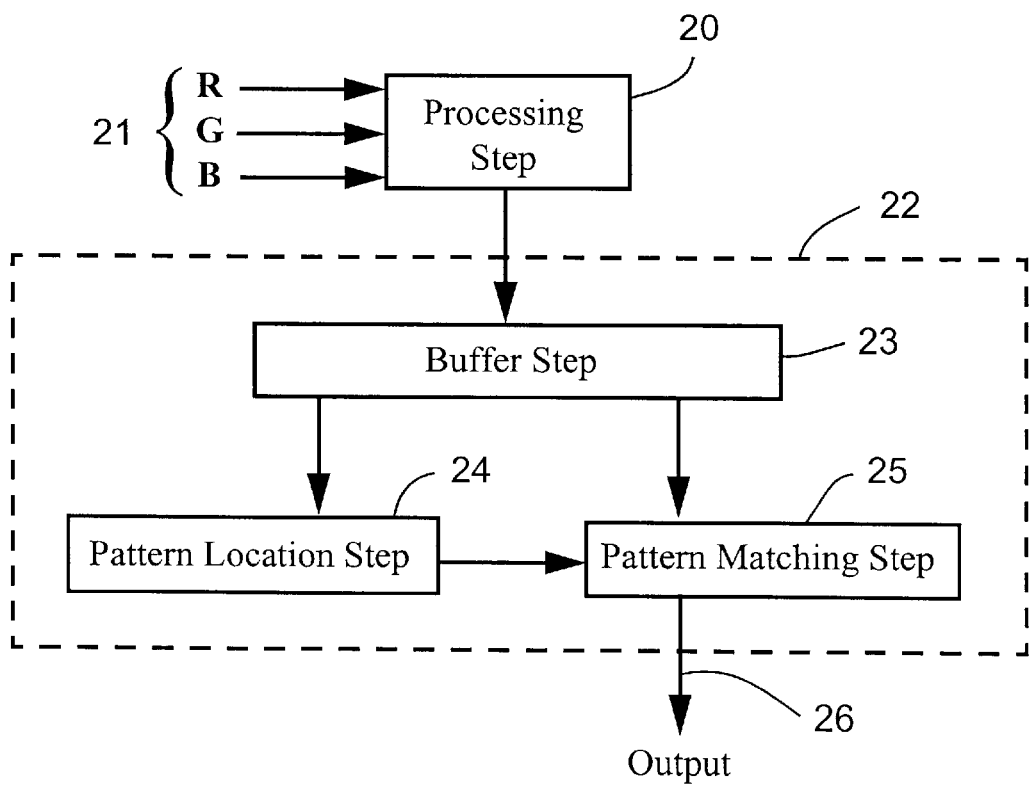
FIG. 2 is a flow-chart of processing steps according to the embodiments of the present invention.

Referring to FIG. 2 there is shown a block diagram representing an overview of the steps processed in accordance with the embodiments of the present invention. An image having a predetermined marking formed therein is input, for instance via a digital image scanning device, to a preprocessing step 20. The input image is typically received at the preprocessing step 20 as RGB colour channel information 21 on a pixel by pixel basis, where the input image data is down-sampled and colour encoded. The colour coded image data from the preprocessing step 20 is then processed by a mark detection step 22 as described hereinafter.

Throughout this specification a foreground pixel is to be construed, unless otherwise noted, as a pixel having a pixel (colour) value belonging to a predetermined set of colour values and a background pixel is to be construed, unless otherwise noted, as a pixel not being a foreground pixel.

The preprocessing step 20 is primarily used to provide a down sampling and foreground/background filtering of the input image. One advantage obtained by preprocessing is that a predetermined number of specified resolutions can be passed to the mark detection step 22, each resolution being substantially independent of an input resolution value and magnification value (or scaling) of the input image, provided an effective resolution of the input image data is greater than or equal to a threshold resolution. The effective resolution of the input image data is determined as the input resolution multiplied by the magnification value. For example, if the threshold resolution can be 400 dots per inch (dpi) in a horizontal dimension and 200 dpi in a vertical dimension of the image, the effective resolution should therefore be equal to or greater than the threshold values in the corresponding dimensions for the output resolution of the preprocessing step 20 to be substantially independent of an input resolution value and magnification value. Further, by extracting substantially those features of interest from the input image data (e.g. specific colours and background/foreground contrast), the quantity of data (bits) required for the encoding of each pixel in relation to these features can be significantly reduced.

Figure 3:
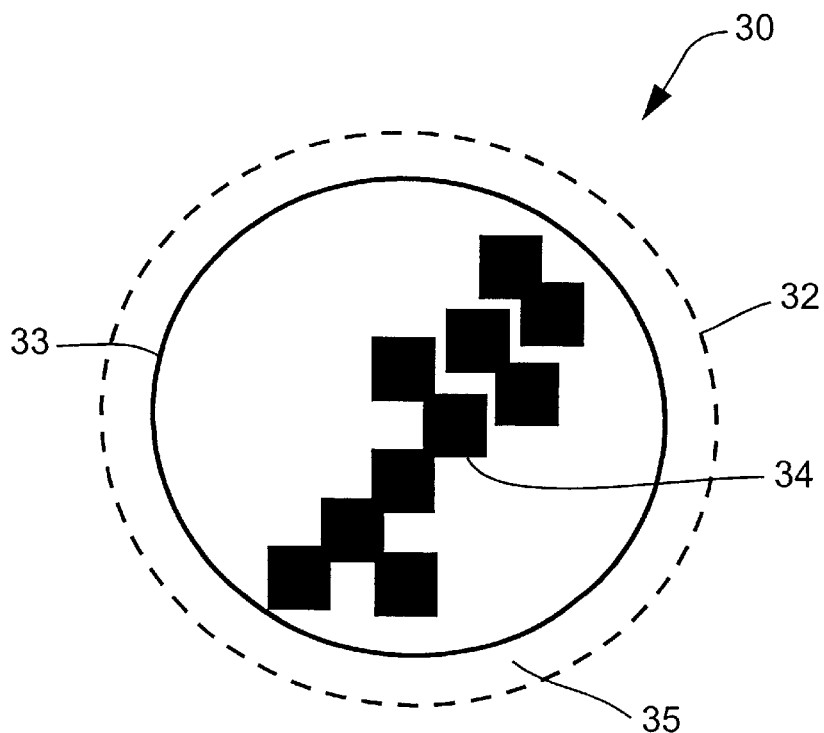
FIG. 3 an example of a mark to be detected in accordance the embodiments of the present invention.

FIG. 3 is an example of a mark 30 that is embedded into an image and detected in accordance with the embodiments of the present invention. FIG. 3 shows the mark 30 comprising a first circular boundary 32, a second circular boundary 33 concentrically arranged within the first boundary 32, and a predetermined pattern within the bounds of the second circular boundary 33. In addition, the mark 30 is defined by a predetermined colour scheme which aids the identification of the mark 30 amongst these colours of the image where the mark 30 is embedded. Preferably, to improve a confidence level of the identification (detection) of the mark 30, colours of the image which may result in a detection conflict are not to fall within the first circular boundary 32. That is, preferably the mark 30 is to be embedded in an image at a location in the image where the colours used to define the mark 30 facilitate the detection of the mark 30. The first circular boundary 32 is shown dashed in FIG. 3 since such is not necessarily intended to form a visible part of the mark 30, but to trace an outline region for which colours of the image, where the mark 30 is embedded, do not result in conflict which substantially reduces a confidence level of a detection of the mark 30. An example of a conflict that can reduce the confidence level of detection of a mark can include a colour of the image which falls within the first circular boundary 32 which is "similar" or substantially "similar" to the colours of the mark 30 as measured by the mark detection step 22. Here "similar" means similar for the purpose of detection as described hereinafter, not necessarily similar as detected by the human visual system.

The mark 30 can be embedded into an image such that the mark 30 is visibly distinct from the image within which it is embedded, or alternatively the mark 30 can be partly or totally camouflaged by surrounding image colours so that the mark 30 is not readily detectable by the human eye. Further, to simplify the description and to not unnecessarily obscure the invention, it will be assumed hereinafter that the second circular boundary 33 if formed by a single circular line, although in practice the second circular boundary may comprise a plurality of circular lines each line having a predetermined colour.

The mark 30 illustrated in FIG. 3 is an example of a mark for the purpose of the description of the embodiments of the invention and should in no way be taken as limiting the scope and spirit of the invention. For example the predetermined pattern 34 can include a different design for each different application purpose. Thus, for example a passport photograph may have one or more marks embedded therein, all having a common design so that upon detection by a reproduction system of any one of the plurality of marks the reproduction system is prevented from duplicating the passport photograph. Another example application is to prevent or at least obstruct attempts to forge by copying legal currency such as bank notes on a reproduction system. In accordance with the preferred embodiment, at least one mark having a predetermined design is embedded on bank notes and upon the detection of the mark by the reproduction system, the reproduction system can disable a duplication the bank note.

Referring again to FIG. 2, the process steps in accordance with the preferred embodiment includes the mark detection step 22 which receives data (information) from the preprocessing step 20 and attempts to determine whether or not a mark is present in the received data. The mark detection step 22 attempts to detect the presence of a mark by comparing characteristics of the received data with characteristic data of a predetermined mark (hereinafter "known mark"). If a mark is detected in the received data, a value or values representing a statistical confidence level of a degree of matching between the detected mark and known mark is output 26 from the mark detection step 22. The mark detection step 22 includes, a buffering step 23, a pattern location step 24, and pattern matching step 25. The buffering step 23 is preferably performed using two buffer units, each unit storing a different representation of substantially the same portion of the image data resulting from the preprocessing step 20. For the two buffer units, a first buffer unit is used to store a colour coded representation at 3 bits per pixel, and a second buffer unit is used to store a binary representation of 1 bit per pixel. Alternately, a single buffer unit of sufficient size to store two or more representations of at least a portion of the image data can be used without departing from the spirit and scope of the invention.

As previously described, the characteristic data of a known mark is compared with the characteristic data of a detected mark to determine whether or not a match is detected and to deduce a confidence level for the detected match. The characteristic data of a mark (known or detected) used in the comparison can include colour data, outline shape data, size data, luminance characteristics data, image moment data and relative pixel coordinates to colour relationship of a predetermined pattern which forms part of the mark. Whilst one of the above listed characteristics of a mark may suffice for the comparison, it is preferred that two or more characteristics are used in the pattern detection step 22 to maintain high level of confidence in a detected match.

Figure 4:
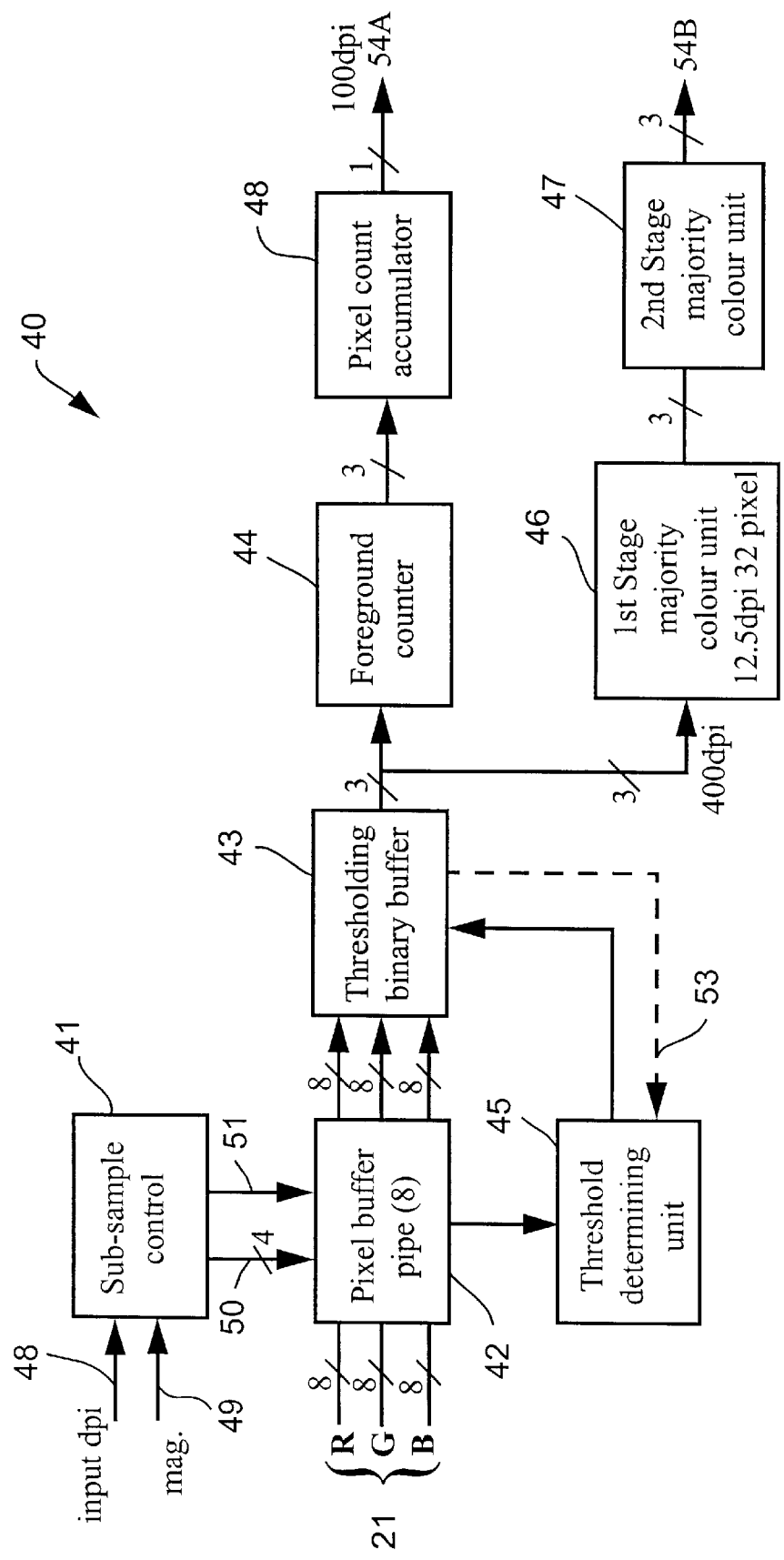
FIG. 4 is a block diagram of a pixel preprocessor in accordance with the preferred embodiment of the present invention.

Referring to FIG. 4, there is shown a preprocessor unit 40 for implementing the preprocessing step 20 of FIG. 2. The preprocessor 40 comprises, a sub-sample control unit 41, a pixel buffer pipe 42, a thresholding binary buffer unit 43, a threshold determination unit 45, a first 46 and second 47 stage majority colour unit, foreground counter unit 44, and a pixel count accumulator 48.

The pixel buffer pipe 42 accepts input image data 21 from an input device such as a scanner, typically in the form of 8 bits per channel for each of red, green and blue (R,G,B). The pixel buffer pipe 42 also receives a horizontal sub-sample signal (H-signal) 51 and a vertical sub-sample single (V-signal) 52 from the sub-sample control unit 41 which is used to respectively determine the horizontal and vertical sub-sampling of the input image data 21. The sub-sample control unit 41 determines an amount of sub-sampling require to achieve a predetermined threshold resolution in each dimension and generates the H-signal and V-signal accordingly (e.g. 400 dots per inch in each dimension).

The preprocessor 40 of the preferred embodiment has two outputs 54A and 54B, each output providing a specified resolution and data format representation. For example, the output 54A provides a binary bitmap of the input image data 21 at 100 dpi per dimension (horizontal and vertical), and the output 54B provides a 3 bits per pixel colour encoded representation of the input image data 21 at 12.5 dpi per dimension.

To generate the H-signal and V-signal the sub-sample control unit 41 utilises an input resolution signal 45 and/or a magnification signal 49 received from the input (scanner) device. The magnification signal 49 is used if the signal is available from the input device otherwise the magnification is assumed to be one (1), that is, no magnification was applied to the input image data 21 at the input device. The magnification signal 49 is typically available where the input device, for instance, forms part of a photocopier which allows an operator to select a reduction or an enlargement for a copy of the image to be reproduced.

In addition to down-sampling (or sub-sampling) the input image data 21 to the predetermined resolution, the pixel buffer pipe 42 is also used in a dynamic determination of foreground threshold values by the threshold determination unit 45.

Figure 5:
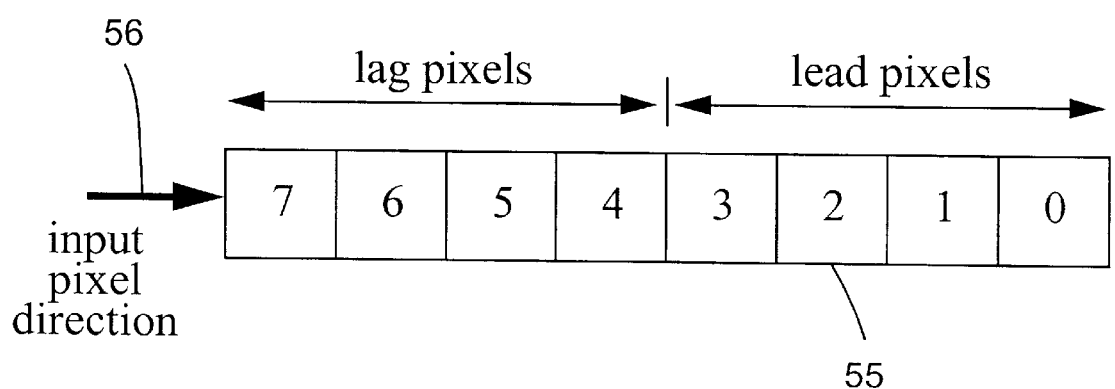
FIG. 5 is a representation of a pixel buffer pipe of the pixel preprocessor of FIG. 4.

Turning to FIG. 5 there is shown a representation of a plurality of consecutive pixels 55, of a current scanline of the input image data 21, temporarily stored in the pixel buffer pipe 42. That is, the RGB values for eight consecutive pixels of a current scanline label 0 (zero) to 7 (seven) are shown in FIG. 5. The pixel labelled 0 (zero) is the current pixel being processed while pixels labelled 1 to 7 are yet to be processed as the current pixel, with the lowest label value being the next pixel to be processed as the current pixel. The pixels labelled 0 to 3 are termed "lead pixels" and the remaining four pixels (labelled 4 to 7) are termed "lag pixels". Pixels enter 56 the pixel buffer pipe 42 so that a new pixel entering starts with label 7 (seven) and is progressed along the buffer pipe 42 to the label of 0 (zero) with each additional pixel entering the buffer pipe 42. Upon processing current pixel (pixel labelled 0) the pixel is sent to the thresholding binary buffer 43.

Referring again to FIG. 4, the threshold determination unit 45 determines from the lag pixels, a foreground threshold value which is to be applied to a current pixel in the thresholding binary buffer 43. In practice, the current pixel in the thresholding binary buffer 43 is the pixel labelled 0 (zero) in the pixel buffer pipe 42 since the pixel labelled 0 (zero) is passed to the thresholding binary buffer 43 in synchronisation with the determination of the foreground threshold value. The foreground threshold value is preferably a linear function of the average values of the lag pixels. Preferably, each colour channel of each pixel is processed independently and thus a foreground threshold value for a pixel comprises a foreground threshold value for each colour channel. The foreground threshold value for a pixel dynamically changes with a change in the average value of the lag pixels.

The thresholding binary buffer 43 is used to determined whether or not a current pixel is a foreground or a background colour. A foreground colour is a colour belonging to a predetermined (or pre-selected) set of colours, while colours not pertaining to the predetermined set are term background colours. Typically, the predetermined set of colours is chosen so that each colour in the set is a colour substantially designated for one or more known marks. Thus, a foreground pixel is a pixel which has an appropriate combination of the primary colours (red, green and/or blue) so as to be within a range of colours that have been designated for the known mark. A background pixel is a pixel which has a colour outside the range of colours designated for the known mark. The threshold binary buffer 43 performs this determination (detection), by thresholding the foreground threshold value against a current pixel value, whether the current pixel is a foreground pixel or a background pixel. If the current pixel is a foreground pixel a "hold" feedback signal 53 is generated, by threshold binary buffer 43 to the threshold determination unit 45, which sets on hold a current foreground threshold value thereby maintaining the current foreground threshold value constant. That is, preventing the foreground threshold value from dynamically changing, as previously described, until such time that the hold signal is released. Otherwise the current pixel is a background pixel, in which case the hold feedback signal 53 is set to "release" allowing the foreground threshold value to dynamically change, as previously described.

In addition to determining those pixels that are foreground and those that are background, the thresholding binary buffer 43 preferably performs a colour encoding and filtering of the image data received from the pixel buffer pipe.

The colour encoding technique used by the thresholding binary buffer 43 assumes that the known mark comprises a predetermined number of colours and each of those colours is considered a foreground colour, and a colour which is not one of the predetermined colours is taken to be a background colour. For example, if the combined one or more known marks comprise at most seven colours, then 3 bits per pixel will suffice for the colour encoding. Each foreground colour being assigned a value from 1 to 7 and a background colour a value of 0. Thus, in the present example, an output value of four from the thresholding binary buffer 43 indicates that the corresponding pixel is one of the seven foreground colours. An output value of zero indicates that the corresponding pixel in not a foreground pixel.

The filtering performed by thresholding binary buffer 43 is used primarily to remove from the input image data possible noise generated by fine lines less than two pixels wide or isolated pixels having a foreground colour which may be present in the input image data. To achieve this filtering, the thresholding binary buffer 43 outputs for every two consecutive pixels having a same foreground colour, a single corresponding foreground colour value and otherwise a single background colour value. That is, a logical "AND" is performed on every two adjacent pixels of a scanline such that if a first and second adjacent pixel have the same colour value then that colour value is output by the filter, otherwise the filter outputs a background colour value.

The (filtered) colour encoded pixel value output from the thresholding binary buffer 43 is input to both the foreground counter unit 44 and the first stage majority colour unit 46. At input to the foreground counter unit 44 individual bits of the binary representation of each colour encoded pixel value are "OR"ed together to produce a binary bitmap, in which a "1" (one) represents a foreground pixel and a "0" (zero) a background pixel. At this stage in the processing, the binary bitmap has substantially the same resolution as that governed by the sub-sample control unit 41, typically 400 dpi in each dimension. The foreground counter unit 44 and the pixel count accumulator 48 cooperate to reduce the binary bitmap to a resolution of 100 dpi per dimension. A mapping from 400 dpi per dimension to 100 dpi per dimension is a mapping ratio of 16:1. Thus a square of 16 pixels at 400 dpi per dimension resolution is mapped to 1 pixel in the 100 dpi per dimension resolution. This is achieved by the foreground counter unit 44 and the pixel count accumulator 48. The foreground counter unit 44 performs the following steps:

a) process a scanline:
   aa) count a total number of foreground pixel values of M consecutive pixel locations of a scanline and stores the total number in at a location of the pixel count accumulator 48;
   ab) repeat step aa) for a next M consecutive pixel locations storing the total number of foreground pixel values at a next location of the pixel count accumulator 48;
   ac) repeat step ab) until substantially the entire scanline has been processed;
b) repeat step a) for N scanlines accumulating a total number count of corresponding M consecutive pixel locations in the same corresponding location of the pixel count accumulator 48 described in step a), thus accumulating a total number of foreground pixel values for each region of M×N pixel into each location of the pixel count accumulated;
c) thresholding the accumulated total number of foreground pixel values is each location of the pixel count accumulator, preferably by a threshold value (M×N/2) equal to half the number of pixel location of the M×N region:
   ca) outputting a "1" if the accumulated total number of foreground pixel value, in each pixel count accumulator location is greater than or equal to the threshold value; or
   cb) outputting a "0" if the accumulated total number of foreground pixel value in each pixel count accumulator location is less than the threshold value; and
d) repeating steps a) to c) until substantially the entire input image data has been processed.

In the preferred embodiment the steps performed by the foreground counter unit 44 described above map a 400 dpi×400 dpi image data to a 100 dpi×100 dpi binary bitmap, and therefore in the present embodiment M and N each have a value of four (4). Those skilled in the art will recognise that with minor variations to the steps described above other mapping resolutions may be obtained without departing from the scope and spirit of the present invention. For example, if M is 4 and N is 2 the steps described above will map a 400 dpi×200 dpi resolution image data to a 100 dpi×100 dpi binary bitmap.

The thresholding binary buffer 43 also provides the colour encoded data to the first stage majority colour unit 46 at substantially the same resolution as that governed by the sub-sample control unit 41. The first stage majority colour unit 46 down samples the resolution by providing as output a single pixel value in every P consecutive pixel (along a scanline direction—typically horizontal direction) values input to the unit 46. The single output pixel value is determine as the pixel value having the highest frequency (occurrence) in the P consecutive pixel values. For instance, of the eight possible colours, seven foreground colours and one background colour, if the most frequently occurring colour (pixel value) in P consecutive pixels is one of the foreground colours then the single pixel value output is assigned that colour. A background colour, for the single pixel value, is output only if all P consecutive pixels are background colour. Further, if two or more foreground colours are equally likely then one of the equally likely colours is chosen, at random, as the colour of the single pixel value. In the preferred embodiment of the invention a desired output resolution for the colour encoded data is 12.5 dpi×12.5 dpi. Thus, in a preferred implementation, P takes a value of 32 resulting in an output resolution from the first stage majority colour unit 46 of 12.5 dpi (400 dpi input divided by 32) in the horizontal direction (or along a scanline direction) and 400 dpi in the vertical direction (or across scanlines).

The output of first stage majority colour unit 46 is input to the second stage majority colour unit 47 which performs a substantially similar function, in a substantially similar manner, as the first stage majority colour unit 46 excepting that Q consecutive pixel (across scanlines—typically vertical direction) values are used. For example, if the input to the second stage majority colour unit 47 is 12.5 dpi in the horizontal direction (or along a scanline direction) and 400 dpi in the vertical direction (or across scanlines), and Q is assigned a value of 32 then the output resolution is 12.5 dpi×12.5 dpi of colour encoded data as previously described. Thus, each pixel from the output of the second stage majority colour unit 47 substantially represents the major colour in a 32×32 block of pixel data output from the thresholding binary buffer 43.

In the preferred form of the present invention, the preprocessor 40 receives input image data 21 as 8 bits per pixel RGB at a resolution preferably greater, or equal to, 400 dpi×400 dpi. The preprocessor 40 sub-samples and encodes the input image data 21 to provide two output representations of the input image data 21. A first output representation is preferably a 100 dpi×100 dpi binary bitmap representation and the second output representation is preferably a 12.5 dpi×12.5 dpi 3 bits per pixel colour encoded representation of the input image data 21.

Figure 6:
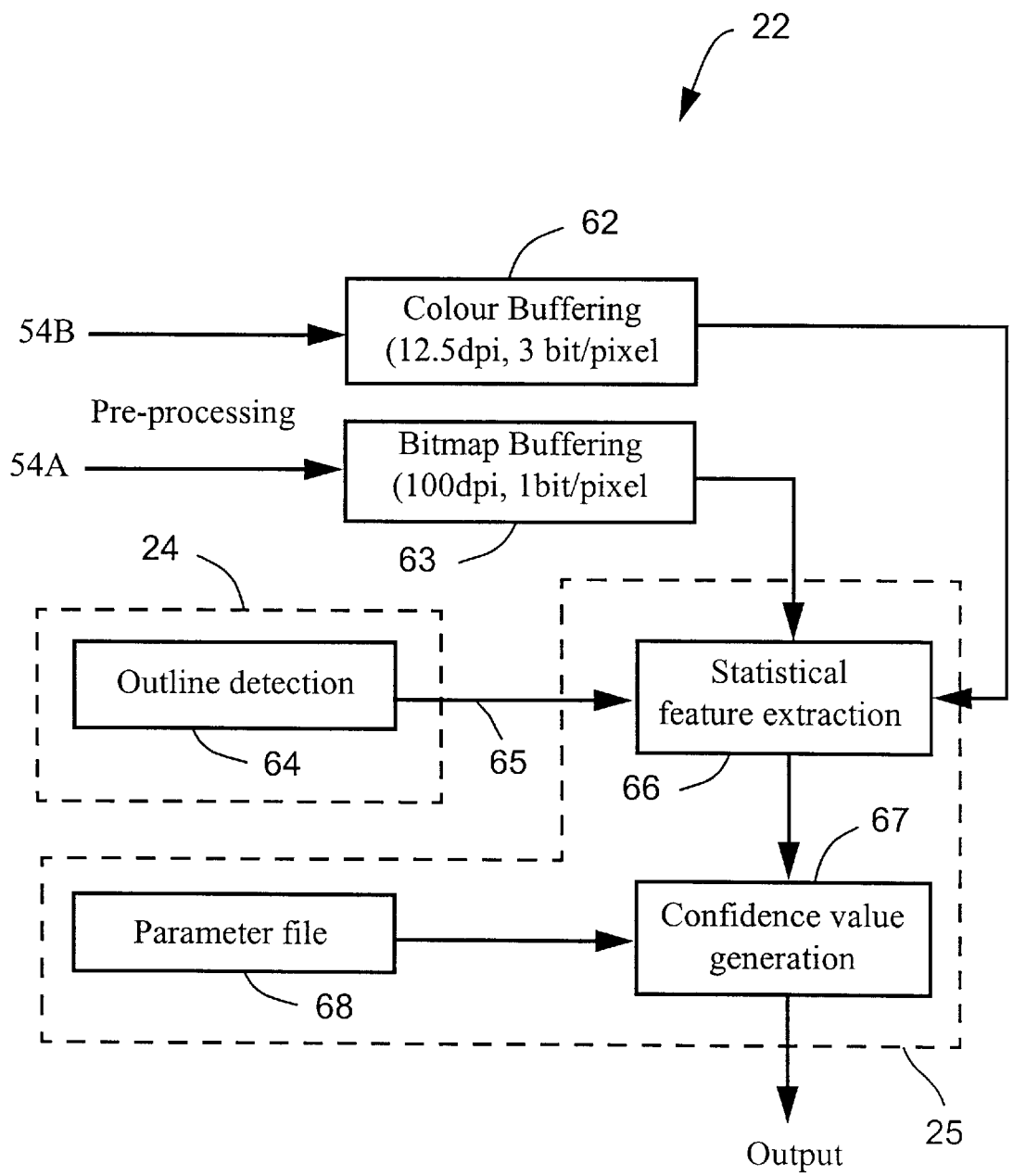
FIG. 6. is a block diagram of processing steps for the mark detection step of FIG. 2 in more detail.

Referring to FIG. 6, there is shown a more detail representation of the mark detection step 22 of FIG. 2. In the preferred implementation of the invention the preprocessing step 20 provides two output representations of the input image data 21 as previously described. Each output representation 54A, 54B is stored or buffered independently 62, 63. The pattern location step 24 of FIG. 2 includes a outline detection step 64 which is used to detect the second circular boundary 33 of the mark 30 shown on FIG. 3 and from which the centre of the second circular boundary 33 is determined.

Figure 7:
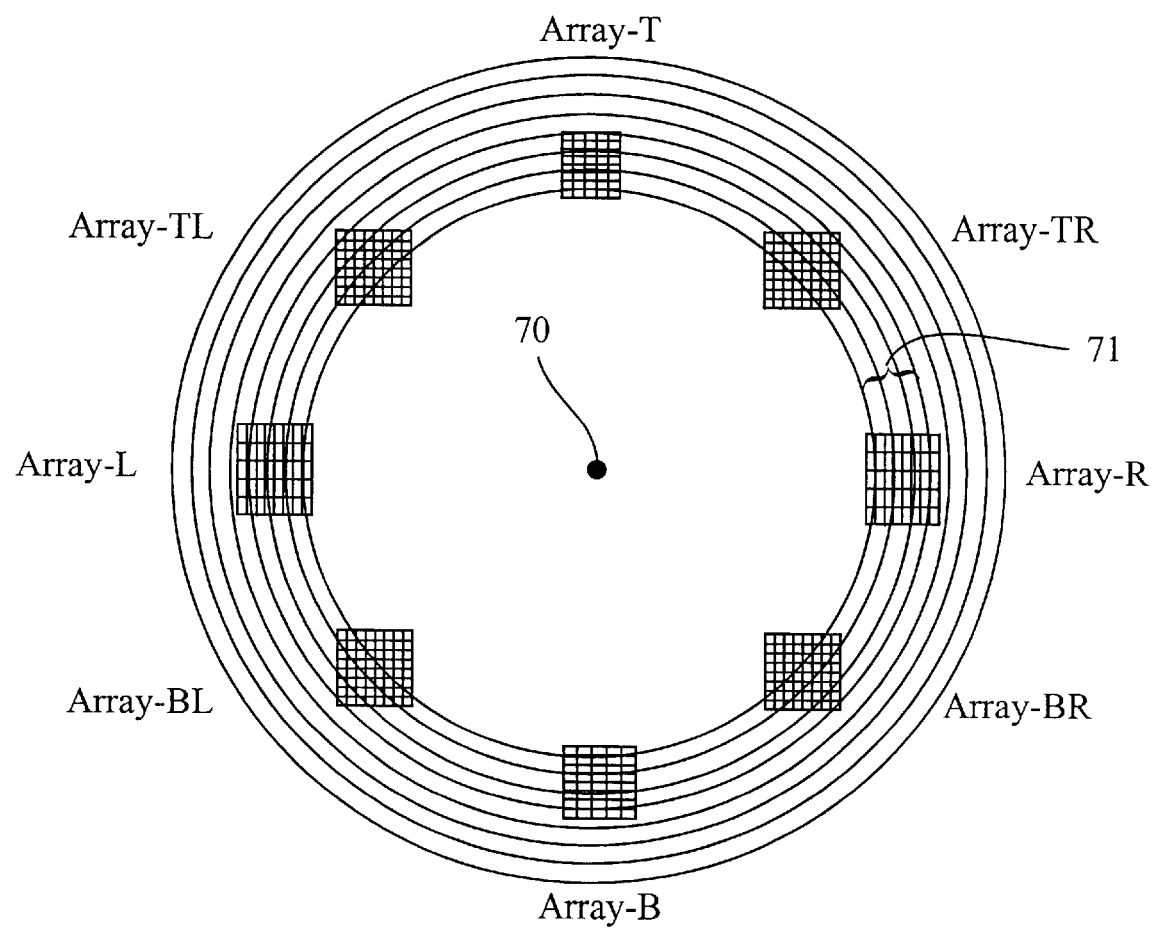
FIG. 7 is a representation of the process of circle detection step.

Referring to FIG. 7 there is shown a technique for detecting the second circular boundary 33 of the mark 30 (hereinafter referred to as "circle detection") in accordance with the preferred embodiment. The circle detection is performed using the 100 dpi×100 dpi binary bitmap representation of the input image data which is buffered 63 by a mark detector in sufficient memory space capable of storing substantially the entire mark 30. A plurality of arrays of pixels at predetermined locations on a portion of the binary bitmap representation are check for foreground coloured (binary "1") or background coloured (binary "0") pixel. For example, as shown in FIG. 7, eight arrays are used each strategically located about a central point 70, and using clock face representation for describing the orientation (geometric arrangement) of each array around the central point 70:

Array_T is located at the 12 o'clock position;
Array_B is located at 6 o'clock;
Array_R is located at 3 o'clock;
Array_L is located at 9 o'clock;
Array_TL is located substantially at 11 o'clock;
Array_TR is located substantially at 1 o'clock;
Array_BR is located substantially at 5 o'clock; and
Array_BL is located substantially at 7 o'clock.

Preferably, each array is two dimensional allowing a possibility of detecting a plurality of radii 71 and their corresponding centre. A radius, of predetermined length, is detected, and its corresponding centre is determined when predetermined locations of the arrays have pixel values determined as foreground pixels. Their total number is greater than a predetermined threshold. For example, if a total number of foreground pixel values of the binary bitmap representation at pixel location indicated by shaded cells 72 of each array is greater that a predetermined threshold, then a circle is considered detected and a set of coordinates, in relation to the binary bitmap representation, for a central point 70 is stored in a temporary buffer (not shown) as hereinafter described.

The circle detection and centre determination hereinbefore described is typically performed on a pixel-by-pixel basis using a thresholding technique which often results in the determination of a cluster of centres where only a single centre should reside. To improve a statistical confidence level of detection of a mark, a single centre from the cluster is chosen as representative of the centre of the mark. Thus, preferably the temporary buffer can store a plurality (cluster) of centres from which a single centre is selected. The centre is chosen (selected) from a cluster of centres on the basis of a statistical variance. For example, a statistical variance is calculated for each centre of a cluster and a centre having the least variance for the cluster is selected as the centre of the mark. The centres of a cluster can be stored as a set of coordinate values in a temporary buffer until one centre is selected form the cluster. Alternately, a cluster of centres information can be stored as a binary bitmap with binary "1" representing a centre in the cluster and an image processing sharpening filter can be used to achieve a substantially similar effect by eliminating all but one of the centres and of selecting a centre from a cluster (plurality) of centres without departing from the scope and spirit of the invention.

Returning to FIG. 6, coordinates representative of a circle centre (a single selected centre) are passed 65 to the pattern matching step 25. The pattern matching step includes a statistical feature extraction step 65, and a confidence value generation step 67 which uses a parameter file 68 of statistical parameters for determining a confidence level between a known mark and the detected mark.

Features determined, for a detected mark, by the statistical feature extraction step 65 are compared with corresponding features of a known mark by the confidence value generation step 67. Preferably the features are orientation independent. For example rotationally invariant features (i.e. orientation independent) of a mark used in the statistical feature extraction step 65 include:

1) total number of foreground pixels of the mark;
2) dominant colour in of the mark; and
3) Zernike moment features derived from the mark.

The parameter file stores information relating to these or substantially similar features of one or more known marks for which detects is sought.

In the present embodiment, features 1) and 3) above of a detected mark are derived from the 100×100 dpi buffered 63 bitmap image. The dominant colour feature is derived from the colour encoded data independently buffered 62. A method according to the preferred embodiment for determining the above features are described below.

A total number of foreground pixels is preferably determined by dividing a region for which a total number foreground pixels is desired into a plurality of concentric zones, and determining in each concentric zone the number of foreground pixels such that a sum of the number of foreground pixels in all of the plurality of concentric zones provides the total number of foreground pixels for the region. Thus the total number of foreground pixels for a region, typically the size of a mark, is compared with a total number of foreground pixels for a known mark. An advantage of dividing the region into zones is that, in addition to comparing foreground pixels of the entire region, a total number of foreground pixels for each concentric zone of the region is compared with a total number of foreground pixels in each corresponding zone of the known mark. This decreases the likelihood of a match where a detected mark has a correct number of total foreground pixels in a region but does not have a correct distribution of the foreground pixel when compared to the known mark. The comparison is typically performed by thresholding the determined value with a predetermined (or expected) threshold value. Alternate zone division can be adopted without departing from the scope and spirit of the invention. For example, a region which is to tested can be divided into sectors and each sector can be used as the zones described above.

Figure 8:
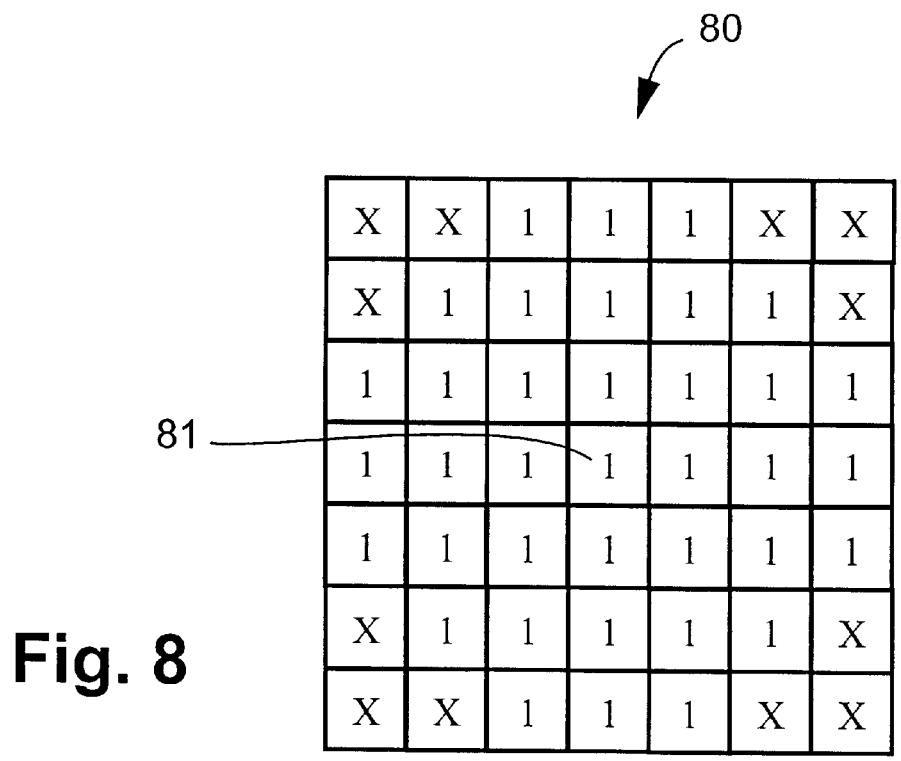
FIG. 8 is a representation of a mask or template for a determination dominant colour of a region.

Referring to FIG. 8. there is shown a mask (or template) 80 for a dominant colour of a region. At each position in the mask denoted by an "X" indicates that a corresponding pixel position is not used to determine a dominant colour in a region spanned by the mask. At each position in the mask denoted by a "1" indicates that a pixel value at a corresponding pixel position is used to determine the dominant colour in the region. The mask is applied to the buffered colour coded data 62 of FIG. 6 and is preferably comparably sized so as to be capable of encompassing an entire mark. The mask is preferably applied only where a centre of a circle has been detected and a central cell 81 of the mask 80 is typically made coincident with the pixel at the circle centre. This reduces unnecessary applications of the mask 80. A tally of pixel values (i.e.: colours) is determined for each colour within the region of the mask 80 mapped out by "1". A dominant colour for the region is then ascertained from the tally. The dominant colour for the region is compared with a dominant colour of a known mark.

Zernike moments are determined from the buffered 62 bitmap image at the statistical feature extraction step 66. The determined moments are compared with corresponding Zernike moments for a known mark. The magnitude of a Zernike moment is invariant under rotation upon a unit disk in a mathematical complex plane. This aspect of Zernike moments provides a rotationally invariant technique of comparing the distribution of two patterns (or marks) for their differences and similarities. Zernike moments can be defined by the following equations:

$$A_m = \frac{(n+1)}{\pi} \sum_x \sum_y \int (x, y) V^*_{nm}(x, y)$$

where $$V_{nm}(x,y) = V_{nm}(p, \theta) = R_{nm}(p)e^{jm\theta} = VR_{nm}(x,y) + jVI_{nm}(x,y)$$

and $$R_{nm}(p) = \sum_{s=0}^{\frac{n-|m|}{2}} (-1)^s \frac{(n-s)!}{s!\left(\frac{n+|m|}{2}-s\right)!\left(\frac{n-|m|}{2}-s\right)!} p^{n-2s}$$

and $x^2+y^2<=1$, $n-|m|$ is even and $n-|m|>0$.

In the above equation, the function f(x,y) takes on a value of one "1" or zero "0" according to the buffered 63 bitmap binary image, where x and y of the function represents the coordinated position of each pixel in the bitmap. The moment feature is calculated as a discrete integration of the conjugate of $V_{nm}(x,y)$—with f(x,y) acting as a selector, i.e. if f(x,y) is '1' the corresponding $V_{nm}(x,y)$ conjugate is added to the integration result, otherwise it is ignored. In practice a set of look-up-tables can be used to reduce the complexity of evaluating the above equation.

A plurality of moment features for a region of the bitmap image, preferably the region is large enough to encompass an entire mark, are computed. The moment features for the region is compared to the moment features of a known mark from which a confidence value indicating the closeness of a match is determined as hereinafter with reference to the apparatus of the embodiment of the invention.

Figure 9:
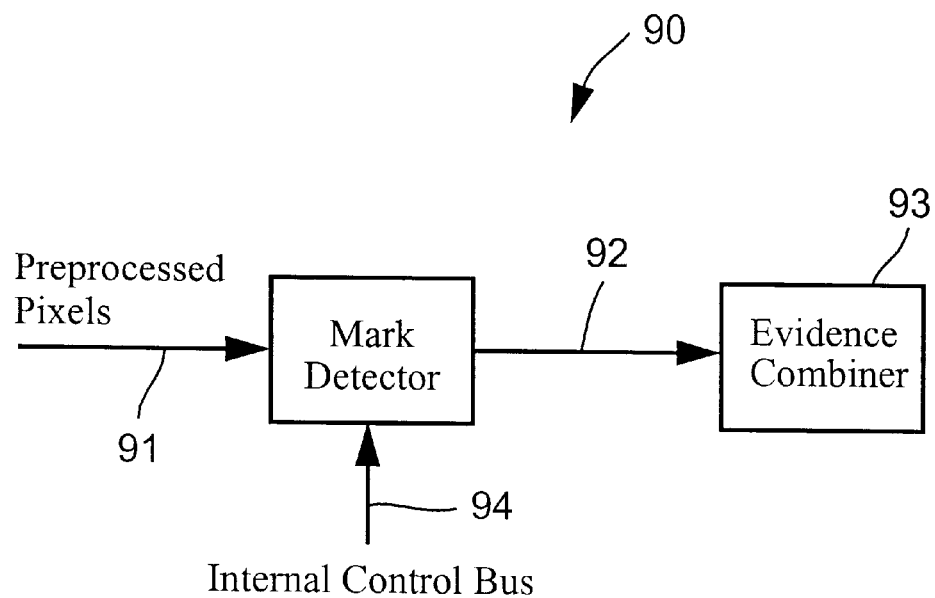
FIG. 9 is a representation of a mark detector and evidence combiner according to the preferred embodiment.

Referring to FIG. 9 there is shown a mark detector 90 in accordance with the preferred embodiment of the present invention. The mark detector 90 scans the pixel preprocessor 40 output for circles with specific radii as previously described. Upon detection of a circle of specified radius, statistical parameters are calculated for pixels in and/or on the detected circle. The calculated parameters are compared with corresponding parameters of one or more know marks. A confidence value is computed based on a similarity between the detected mark (i.e. circle and pixels therein) and a known mark. The confidence value is sent to an evidence combiner 93 to determined, for example, whether or not a reproduction of the input image is to be permitted by the photocopier.

The mark detector 90 uses the photocopier input clock signal, pclk, to process the down sampled image data coming from the pixel preprocessor 40. A global reset signal, prst, is used to reset all counters in the mark detector 90 and place the mark detector in a state to receive data from the pixel preprocessor 40 and preferably generate a non-zero confidence value signal on the basis of analysis of the data received.

A pixel preprocessor Interface 91 connects the pixel preprocessor 40 to the mark detector 90 so that both the preprocessor 40 and detector 90 run at the pclk signal rate. A list of signals between the pixel preprocessor 40 and the mark detector 90, typically driven by the pixel preprocessor 40, are shown in Table 1 below.

TABLE 1

| Name | Definition |
| --- | --- |
| pp_pen | page enable signal |
| ppf_len | foreground line enable signal |
| ppf_data | foreground pixel |
| ppf_valid | valid foreground pixel from PP |
| ppc_len | colour line enable signal |
| ppc_data(2:0) | colour pixel |
| ppc_valid | valid colour pixel from PP |

An evidence combiner interface 92 connects the mark detector 90 to the evidence combiner 93 and both the detector 90 and combiner 93 run at the pclk signal rate. Examples of output signals between the mark detector 90 and the evidence combiner 93, through the evidence combiner interface 92, include those signals listed in Table 2 below.

TABLE 2

| Name | Definition |
| --- | --- |
| pt_data | PT mark detected |
| | pt_data[2:0]=p_number |
| | pt_data[9:3] = confidence value |
| pt_valid | Confidence output is valid |

The mark detector 90 contains registers and memory modules, as hereinafter described, which are accessible by an external microprocessor (external to the mark detector) through an internal control bus (ICB) 94. The external microprocessor typically forms part of the reproduction device (e.g.: photocopier). In addition to the above mode of accessibility, the various registers and memory modules can be loaded with data stored in an external ROM module by a data supply unit (not illustrated) at power-up.

Figure 10:
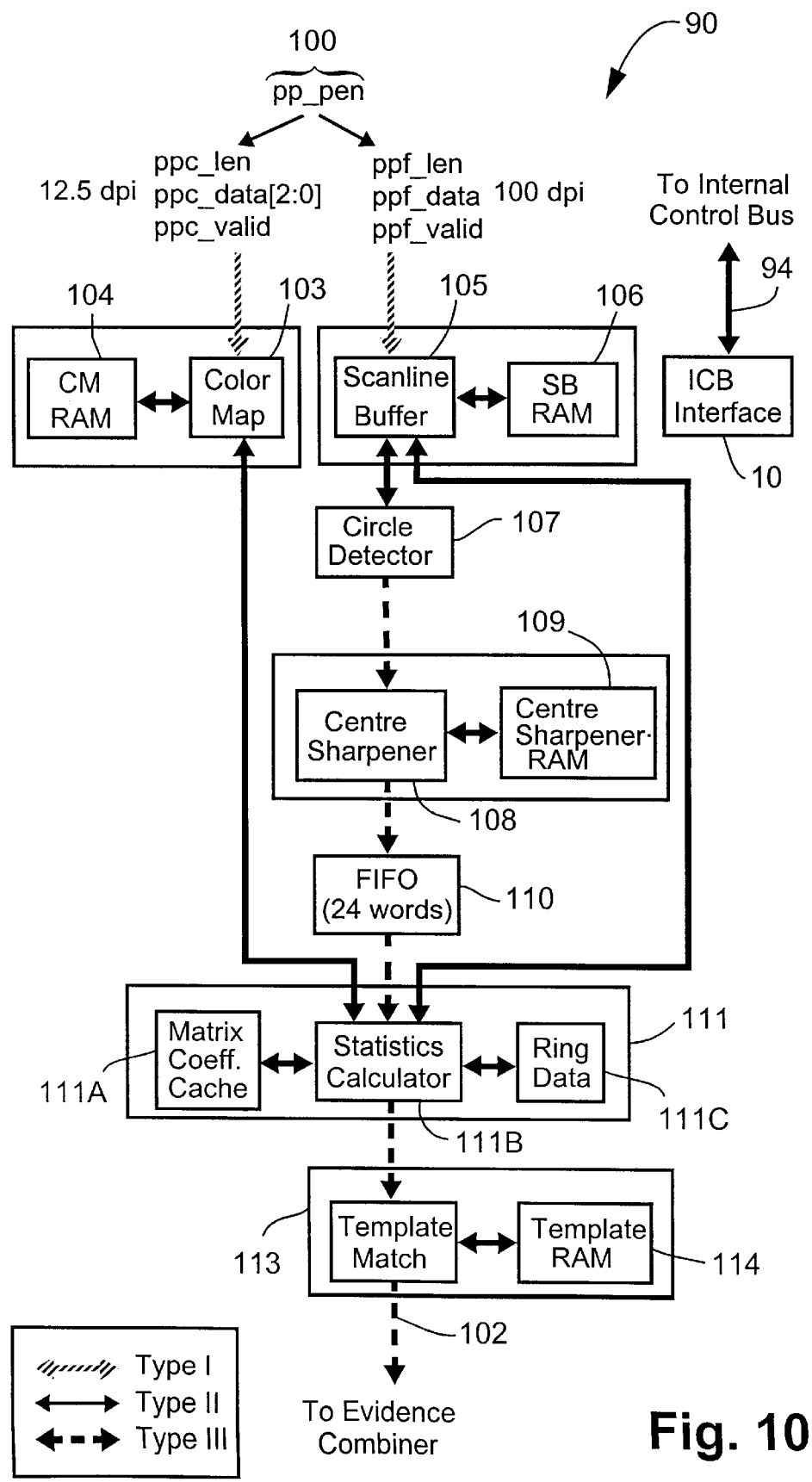
FIG. 10 is a block diagram of the mark detector of the preferred embodiment of the present invention.

Referring to FIG. 10 there is shown the mark detector 90 of the preferred embodiment in more detail. The mark detector 90 comprises a plurality of pixel preprocessor interface buses 100, an ICB 94 and corresponding interface 101, and an evidence combiner interface bus 102 to the evidence combiner interface 92. In addition to the external interfaces described, the mark detector 90 comprises internal buses connecting a plurality of modules. The modules include a colour map module 103 and associated colour map random access memory (CM RAM) 104, a scanline buffer module 105 and associated memory (SB RAM) 106, a circle detector module 107, a centre sharpening filter 108 and associated memory (centre sharpener RAM) 109, a first-in-first-out buffer (FIFO) 110, statistics evaluator module 111 comprising a matrix coefficient cache 111 A, a statistics calculator 111B and a circle (or ring) data memory unit 111C, and a pattern matching module 112 which includes a template matching unit 113 and associated memory 114 referred to hereinafter as template RAM.

In FIG. 10, the Matrix Coefficient Cache 111A, the circle data memory unit 111C and the Template Matching memory unit 114, represent random access memory (RAM) modules which are loaded with data stored in external memory (e.g. read only memory (ROM)) at power-up by a data supply unit (not shown in FIG. 10). Other memory units shown in FIG. 10, including the CM RAM 104, the SB RAM 106, the centre sharpener RAM 109 and the FIFO 110, are used to temporarily store data being processed and typically originating from the pixel preprocessor 40.

The ICB Interface 101 provides an interface between the internal control bus 94 and memory modules 111A, 111C and 114 used in the mark detector 90. The memory modules may be accessed by the external microprocessor for read and write operations when the Mark Detector 90 is not processing image data. The ICB 94 and corresponding interface 101 is also used by the data supply unit for write operations to the memory modules immediately after power-up. Read and write operations to registers contained in the ICB Interface 101 can be performed through the ICB 94.

The Scanline Buffer 105 is logic circuitry used in conjunction with the SB RAM 106 for storing the 1-bit/pixel foreground information received from the Pixel Preprocessor 40 and is used to retrieve the foreground information for the circle detector 107 and the Statistics Evaluator 111.

Figure 11:
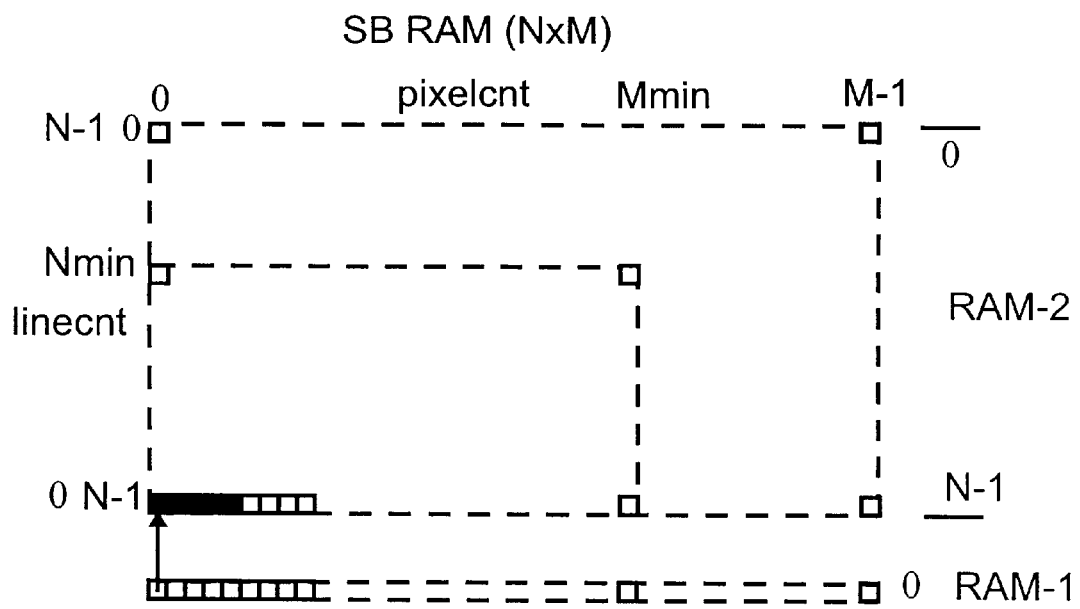
FIG. 11 is a representation of the SB RAM of the preferred embodiment of the present invention.

Referring to FIG. 11 the SB RAM 106 comprises two separate random access memory units, a first RAM unit (hereinafter RAM-1) for storing a single scanline of M pixels per scanline and a second RAM unit (hereinafter RAM-2) provides memory for storing N scanlines with M pixels per scanline. Preferably, RAM-2 is arranged so that each word is N bits wide and each bit of the word corresponds to a pixel on a different scanline. The RAM-1 is used to separate read and write operations upon RAM-2. The 1-bit/pixel foreground information (or binary bitmap data) received from the pixel preprocessor 40 is written into RAM-1 and upon completion of a scanline, the entire scanline is written to the RAM-2. RAM-2 is a dual port random access memory which enables 1-clock cycle data read-modify-write access and two separate read address access for the circle detector 107 and statistic evaluator 111.

Figure 12:
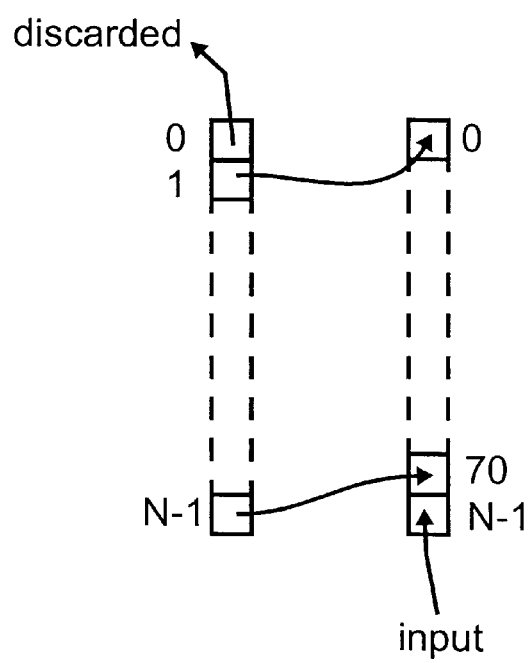
FIG. 12 represents the update sequence of the SB RAM of FIG. 11.

FIG. 12 represents the action on each word in RAM-2 for the process of adding a new scanline and discarding a previously stored scanline in RAM-2. Typically, on each word of RAM-2 the zero location bit is discarded, each bit location for each bit in the word is (decremented) by one and a bit from a (new) next scanline is written to N−1 bit location of the word.

The circle detector 107 implements the circle detection step in accordance with the preferred embodiment of the present invention. As previously described with reference to FIG. 7, the circle detection step utilises a plurality of arrays each array strategically arranged so as to detect circles of a predetermined range of sizes (radii). The circle detector 107 outputs a pair of coordinate values for the centre of the detected circle and deviation value for the centre. The deviation value is an indication or measure on how far removed the detected centre is from a desired circle centre. That is, the deviation value is a measure of how well the plurality of arrays agree on the location of a centre.

The circle detection step further includes an array fill step, an array count step and a data comparison step. The circle detection step is performed by the circle detector 107 on the data in RAM-2 of the SB RAM 106 and is repeated upon each update of the data in the RAM-2 memory.

Figure 14:
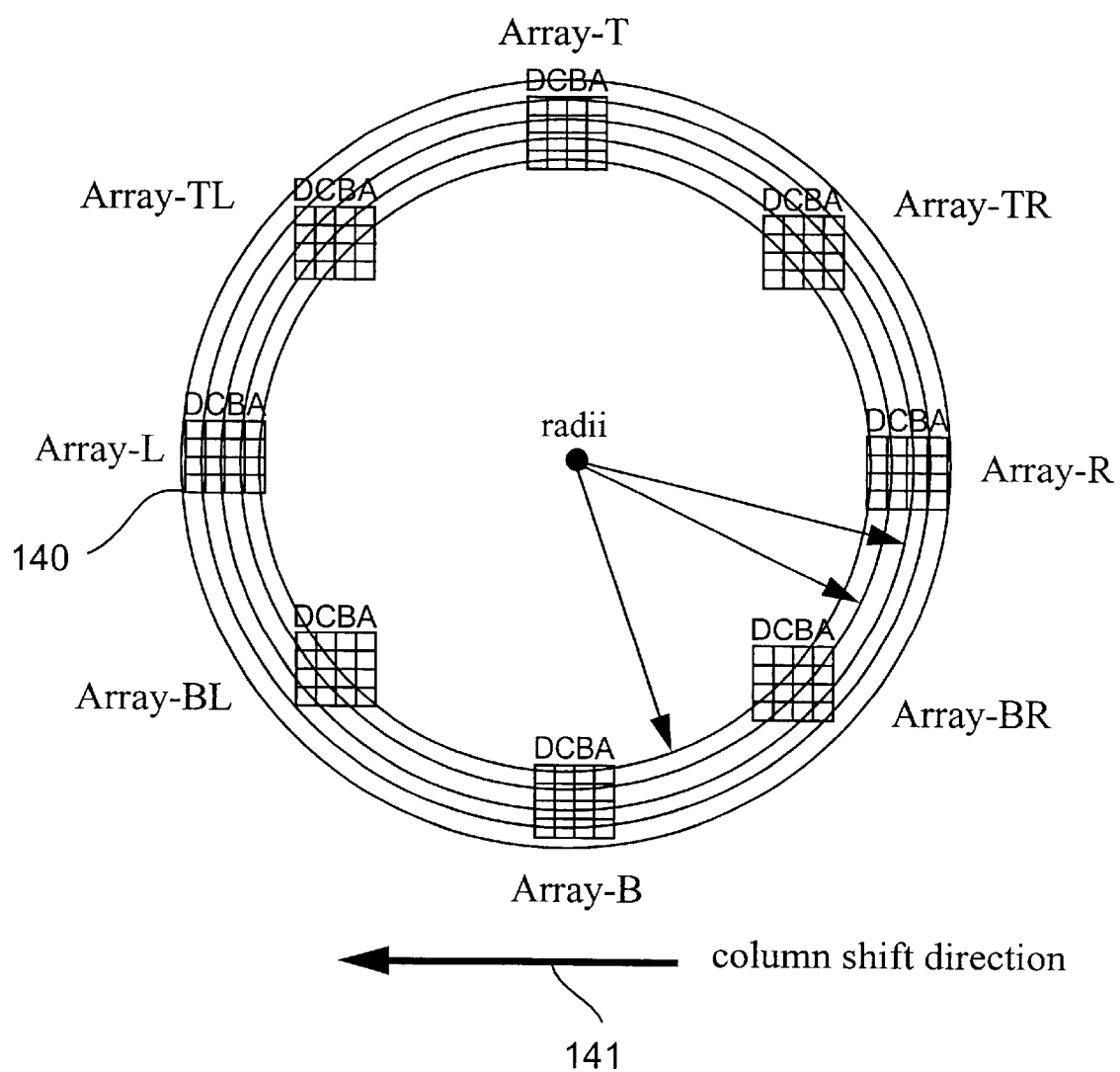
FIG. 14 is a representation of the column shift direction for the circle detection step shown in FIG. 7.

The array fill step shall now be described with reference to FIG. 14. FIG. 14 shows the order in which arrays 140, previously described with reference to FIG. 7, are filled with data. Data for filling the arrays 140 is read out of the RAM-2 of SB RAM 106. To simplify the description and so as not to unduly obscure the invention, each column of the arrays 140, in FIG. 14, is labelled "A" to "D". The array fill step is performed in five stages. At a first stage an N-bit word (column) of the RAM-2 is read out of the SB RAM 107 and a predetermined portion (bits) of the word read are used to fill column "A" of "Array_L". At a second stage another N-bit word (column) of RAM-2 is read and predetermined portions (bits) are used to fill column "A" of Array__TL and Array__BL. At a third stage yet another N__bit word of RAM-2 is read and used accordingly to fill column "A" of Array__T and Array__B. This process continues until at the end of a fifth stage, column "A" of each array 140 is filled with predetermined data originating from the SB RAM 107. The N-bit words read out of the RAM-2 during the five stages are typically addressed by a plurality of predetermined addresses stored in predetermined registers (or memory locations) and a corresponding set of offset addresses stored in a plurality of counters respectively. The offset addresses are initialized at the start of the circle detection step and re-initialized upon repeating the circle detection step with each update of the data in RAM-2. Preferably, with each of the offset addresses initialisation, the arrays 140 are also initialized by "padding" each cell of the arrays 140 with predetermined values.

At the end of the fifth stage the counters (offset addresses) are incremented, and an array count step and data comparison step is performed. Next, data in column "A" of each array 140, of FIG. 14, is shifted or moved to column "B" of each corresponding array 140. That is, at the end of the fifth stage, data in each array is column shifted to an adjacent column of the corresponding array in a direction indicated by the arrow 141 in FIG. 14. Thus at the end of the fifth stage data values in column "D" of each array are discarded; data values in column "C" of each array are moved to corresponding array cells in column "D" of each array, data values in column "B" are similarly moved to column "C", and data values in column "A" are moved to column "B". Consequently, columns "A" of each array are then ready to receive further data values.

The five stage cycle to fill column "A" of each array 140, substantially as hereinbefore described, is repeated with the incremented offset addresses now pointing to another set of N-bit words in the RAM-2. Thus, a cycle of the array file step is complete with a data fill of column "A" for the plurality of arrays. The array count step and data comparison step is also repeated for each cycle of the array fill step previously described until substantially all the binary bitmap data has been scanned.

The circle detector 107 in effect scans the array (geometric) arrangement of FIG. 14 across the content of the SB RAM outputting coordinate values for each circle centre of circles detected and a deviation value for the centre. The scan across the content of the SB RAM is repeated with each update of the SB RAM until substantially all the binary bitmap is scanned. The output from the circle detector 107 is passed to the centre sharpener module 108.

Figure 15:
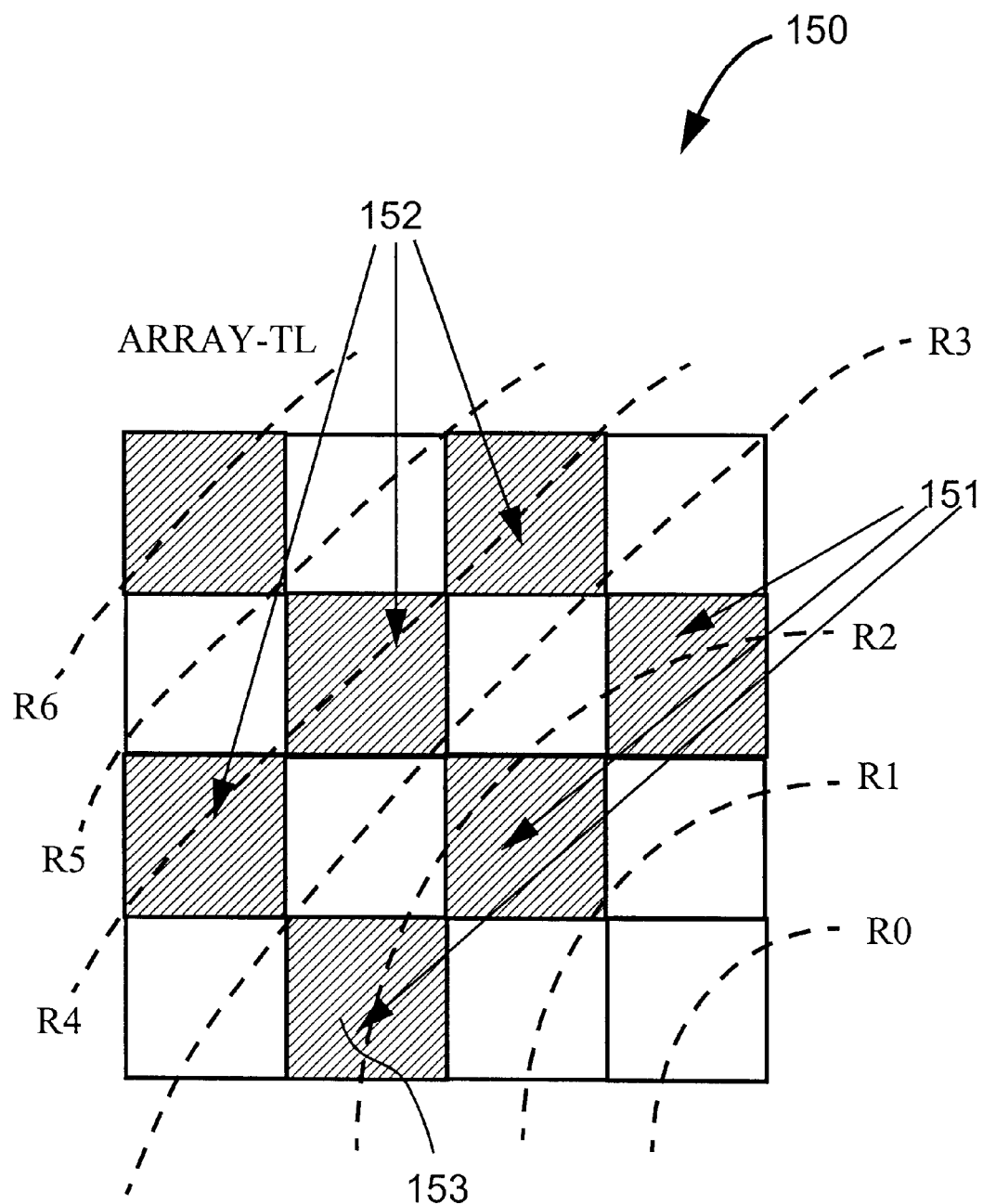
FIG. 15 is a schematic diagram of array "Array_TL" of FIG. 14.

Referring now to FIG. 15, there is shown an example of a pixel mask arrangement 150 for Array-TL of FIG. 14. Other, substantially similar mask arrangements are used for each other array in FIG. 14. The pixel mask arrangement 150 is a representation of array cell locations which are checked for foreground pixels. In addition, FIG. 15 shows a set of radii labelled R0 to R6. Each radius substantially intersects a predetermined sets of cell locations of Array-TL. For example radius R2 substantially intersects three cell locations 151, whilst radius R4 intersects another set of three locations 152. R0 and R6 intersect a single but different cell location each, R1 and R5 substantially intersect a pair of cell locations each and R3 substantially intersect four cell locations. Cell locations substantially intersected by a radius are hereinafter referred to as cell locations associated with the radius. For example, radius R2 is associated with cell locations 151 of FIG. 14.

The array count step determines a total number of foreground pixels in cell locations associated with each radii. A predetermined "evidence value" is evaluated for each array in FIG. 14 on the basis of the total number of foreground pixels in cell locations associated with each radii.

Table 3 below lists an example of a set of inequalities used to evaluate an evidence value for each array 140.

TABLE 3

| Evidence value | Inequality condition |
| --- | --- |
| 4 | R4 >= 3 and R5 <= 1 and R6 <= 1 |
| 3 | R3 <= 3 and R4 <= 1 and R5 <= 1 |
| 2 | R2 >= 3 and R3 <= 1 and R4 <= 1 |
| 1 | R1 >= 2 and R2 <= 1 and R3 <= 1 |
| 0 | none |

A data comparison step is performed by comparing results achieved by the array count step for each radii against the inequalities set out in Table 3.

An example of how an evidence value is determined from Table 3 for an array of FIG. 14 is described below.

For the purpose of the example it is assumed that the array count step determines or detects a total of only three foreground pixels at cell locations 151 associated with radius R2 for array TL (FIG. 15).

The array count step thus produces a result for the total foreground pixels for each radius of R0=0, R1=0, R2=3, R3=0, R4=3, R5=0 and R6=1 in accordance with the described example. Starting from the highest evidence value in Table 3, the corresponding inequalities are tested in accordance with the results from the array count step above. If the inequalities are satisfied then the evidence value is read from Table 3. Otherwise, the inequalities for next evidence value down the table is tested. According to the results obtained by the array count step for the example, the evidence value for Array TL is the value four (4) since the corresponding inequalities are the first satisfied when working down Table 3 from highest to lowest evidence value. If none of the inequalities are satisfied then the evidence value is zero (0). In a substantially similar manner, an evidence value is determined for each array shown in FIG. 14.

Co-ordinate values (x,y) of a centre for a circle are determined from a radius detected by the array count step and a deviation value for the centre is evaluated on the basis of evidence values resulting from the data comparison step.

The deviation value is compared to a predetermined deviation threshold value. If the deviation value is less than the threshold value, co-ordinate values of a centre for a circle are passed to the centre sharpener 108 together with the deviation value. Otherwise, an invalid deviation value (a deviation value greater than a maximum value) is passed to the centre sharpener 108.

In the preferred embodiment, a number of additional precautionary steps are taken to minimize the probability that a circle centre is falsely detected. Those steps include:

checking that each pair of diametrically opposed arrays (e.g. Array-L and Array-R is one pair of diametrically opposed arrays) differ in their evidence values by not more than one (1), otherwise no circle centre is detected;

checking that no more than two (2) arrays in the geometric arrangement of FIG. 14 have a zero (0) evidence value, otherwise no circle centre is detected; and checking that, if exactly two (2) arrays have a zero (0) evidence value then the two (2) arrays with zero evidence values are not adjacently disposed (e.g. Array-L is adjacent to Array-TL and Array-BL) in the geometric arrangement of FIG. 14, otherwise no circle centre is detected. These additional precautionary steps are overriding conditions that if at least one condition is not satisfied the result is no circle centre is detected.

As previously described with reference to FIG. 7 the circle detection process results in a cluster of detected circle centres of which only one centre (referred to as the "true centre") from the cluster is retained while other circle centres (referred to as redundant detections) of the cluster are remove. The centre sharpener module 108 is used to remove redundant detections of circle centres determined by the circle detector 107. Redundant detection of circle centres by the centre detector 107 occurs at locations shifted vertically and/or horizontally in the scan direction, of the centre detector 107, from a true centre. That is, if the centre detector 107 scans data from left to right and from top to bottom then redundant detections occur to the right and/or below a true centre. The centre sharpener module 108 utilises an 8 pixel×3 line block (window), and a true centre is determined as the circle centre having a least deviation value in the block.

Figure 13:
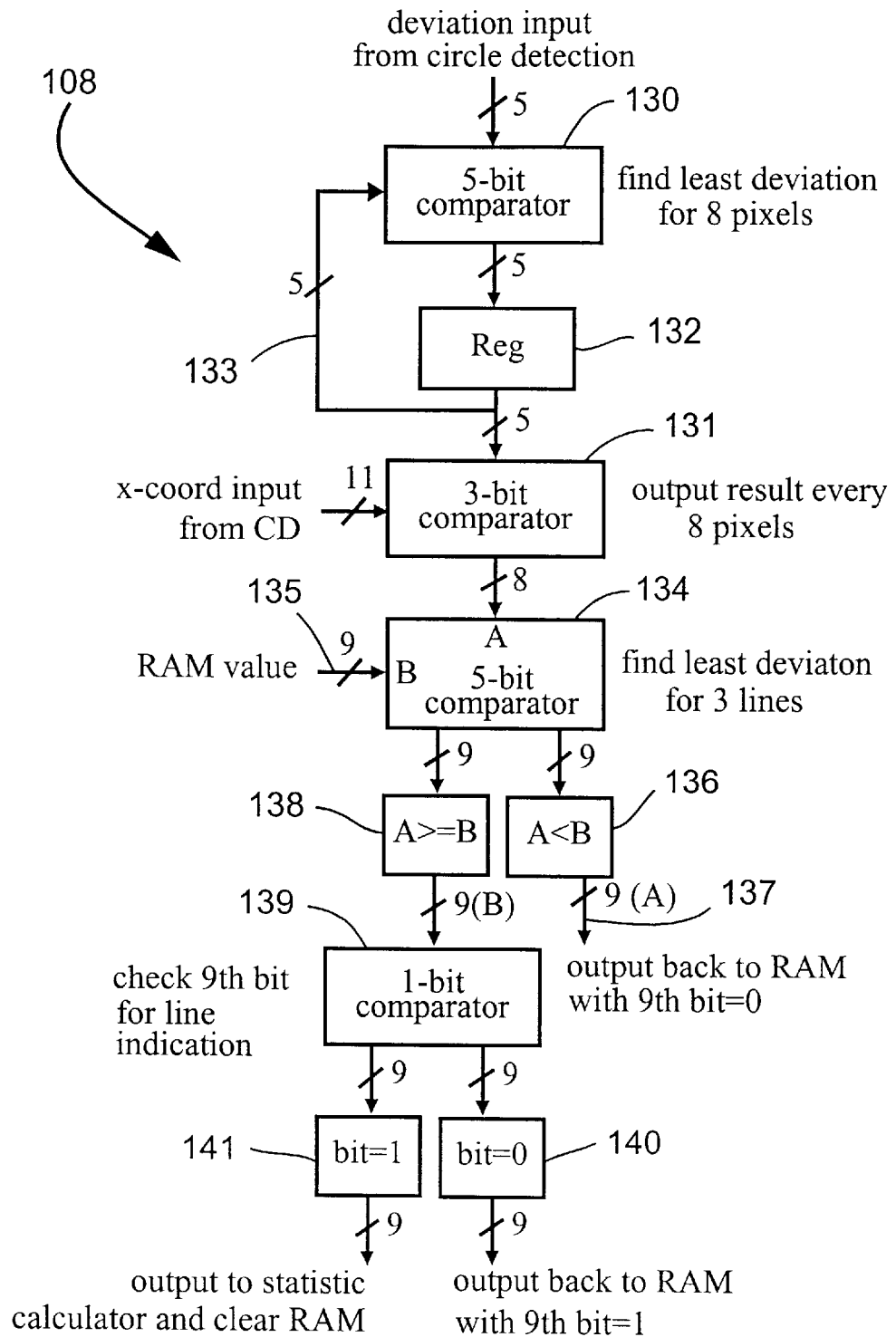
FIG. 13 is a block diagram of the centre sharpener module according to the preferred embodiment.

FIG. 13 shows the centre sharpener 108 of FIG. 10 in more detail. For each circle detected by the circle detector 107 a deviation value and an x-coordinate position of the centre of the circle detected is passed to the centre sharpener 108. At pixel positions where there is no circle centre, a deviation value for the corresponding pixel position is set to a maximum value.

A deviation value is input to a first comparator 130 and an x-coordinate value for a corresponding pixel position is input to a second comparator 131. The first comparator 130, a register 132 and a feedback loop 133 are used to select the least deviation value for 8 consecutive pixel positions. The second comparator 131 outputs a result for every 8 pixels by utilising a lower 3 bits of the x-coordinate value to count through 8 consecutive pixels. The result output by the second comparator 131 includes the lowest deviation value passed on by the first comparator 130 and register 132. A current result from the second comparator 131 is input to a third comparator 134 which also takes input 135 from the centre sharpener RAM 109. The third comparator 134 determines the least deviation value for three adjacent lines of eight consecutive pixels (8×3 window). The centre sharpener RAM 109 is used to store a result or results of a previous line. Where no previous result was available or the centre sharpener RAM 109 is reset (cleared) a predetermined maximum result value is stored in the RAM 109. At the third comparator if the current result is less than the corresponding value 136 stored in RAM 109 then the current result is stored 137 in RAM 109 and a line indicator flag is set to zero (0), indicating that the result occurs on a first line of the three line window. Otherwise, the current result is greater than or equal to the corresponding result 138 stored in RAM 109 in which case the status of the line indicator flag is checked, for the result stored in RAM 109, by a fourth comparator 139. If the fourth comparator 139 finds the line indicator flag set to zero, as seen at 140 in FIG. 13, then the line indicator flag is reset to one (1) indicating that the comparison performed at the third comparator 134 occurs for a value on a second line of three line window. Otherwise, where the fourth comparator 139 finds the indicator flag set to one (1), as seen at 141 in FIG. 13, indicating that the second line has been processed and thus the current line is the third line of three line window, the result stored in RAM 109 is then outputted to the statistics evaluator 111 via the FIFO 110. The RAM 109 is then reset (cleared) as previously described.

Returning to FIG. 10, the FIFO 110 buffers address locations of true centre locations, resulting from the circle detector 107 and the centre sharpener 108, stored in SB RAM 106. The statistics evaluator 111 retrieves the address locations as required.

The colour map module 103 provides the logic circuitry for storing the colour encoded data received from pixel preprocessor 40 into the CM RAM 104. The colour encoded data stored in CM RAM 104 is used by the statistics evaluator 111 to check whether or not a circle (mark) detected by the circle detector 107 has a predetermined foreground colour. That is, the statistics evaluator 111 determines whether or not a region centred on a detected circle centre has a dominant colour and whether or not the dominant colour statistics fall within a predetermined range. An area considered sufficient for the region is an area approximately equal to the area of a smallest one of the known marks for which detection is desired. To provide reduced memory capacity and not to suffer a great cost in performance it is preferred that the CM RAM 104 be configured to store as many scanlines as require by one of the dimensions of the area of the region. For example, if it is envisaged a desired area for a region used in determining the dominant colour of a mark is an area equivalent to a 49 pixel square (7 pixel×7 pixel) then a memory capacity equivalent to seven scanlines of data is desirable.

The colour map module 103 receives address data from statistics evaluator 111 for colour encoded pixel data for pixels within a region for which a dominant colour is to be determined. The address data for the pixels in the region is determined from address data for a circle centre derived from the binary bitmap data in the SB RAM 106. Thus, from an address value (coordinate position) of a circle centre the statistics evaluator 111 determines address values for a desired region of pixel stored in the CM RAM 104. The determined address values are used to read out from CM RAM 104 and send to the statistics calculator 111B a predetermined number of colour encoded pixel values. For all pixel values within the desired region, read out from CM RAM 104, a count is determined for each one of a possible set of foreground colours. For the desired region, a foreground colour having the greatest count value is determined. The statistics evaluator 111 determines a dominant feature attributes, the greatest count value of corresponding foreground colour. The confidence value is passed to the template matching unit 113 and another region centre on a detected circle centre in then processed.

The statistics evaluator 111 in addition to determining a confidence value for the dominant colour feature also performs a foreground pixel count and complex moment calculation to determine the total number of foreground pixels and the Zernike moment feature of a mark respectively. A predetermined size block of pixel data is retrieved from the SB RAM and the block of pixel data is for determining both the foreground pixel count and the complex moment calculation. Preferably, each block is centred on a true centre value for a circle (mark) detected received from the centre sharpener module 108.

The foreground pixel count determines a total number of foreground pixels in and on a detected circle. The detected circle is the second circular boundary 33 (FIG. 3) of a mark and thus the total number of foreground pixels in and on a detected circle is the total number of foreground pixels of the mark.

Figure 16:
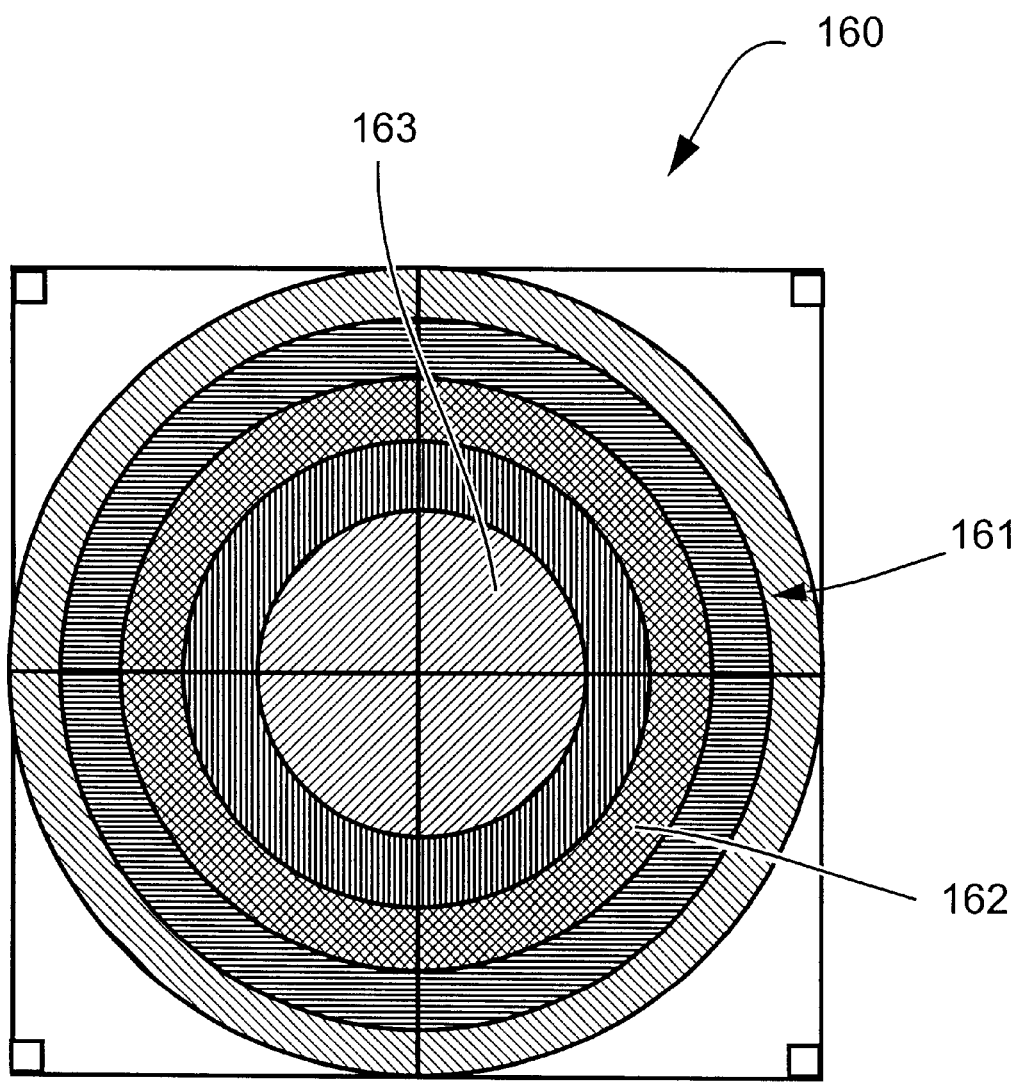
FIG. 16 is a schematic diagram of a foreground pixel count mask according to the preferred embodiment.

Referring to FIG. 16 there is shown a predetermined size block of pixel data 160 retrieved from SB RAM. The block 160 is conceptually divided into a plurality of concentric rings 161 (zones) which form a plurality of annuli 162 and a centre circle 163. Information about a diameter of each ring is stored in the circle data memory unit 111C. A total number of foreground pixels is determined for each annulus and for the centre circle 163. The information stored in the circle data memory is used to identify which one of the annuli 162 a detected foreground pixel belongs to. The total number of pixels determined for each annulus and the centre circle 163 is sent to the template matching unit 113.

A complex moment calculation to determine the Zernike moment feature is performed on substantially the same block of data that is used in the foreground pixel count. A lookup table of coefficients, for determining the Zernike moments, is stored in the matrix coefficient cache 111A typically on power-up (or reset) by the data supply unit via the ICB 94 as previously described. The lookup table can have a number of coefficients corresponding to the number of data pixels in the predetermined size block. However, in practice there is generally a symmetry to the magnitude of the coefficients in the lookup table so that only a quarter of the coefficients effectively need to be stored. This allows a reduction of memory requirements for the matrix coefficient cache 111A. Each coefficient in principle is a complex number having a real and imaginary part, however the real part is the transpose of the imaginary part of each coefficient which means that in practise only the real part of each coefficient can be stored and the imaginary part determined as required.

Figure 17A:
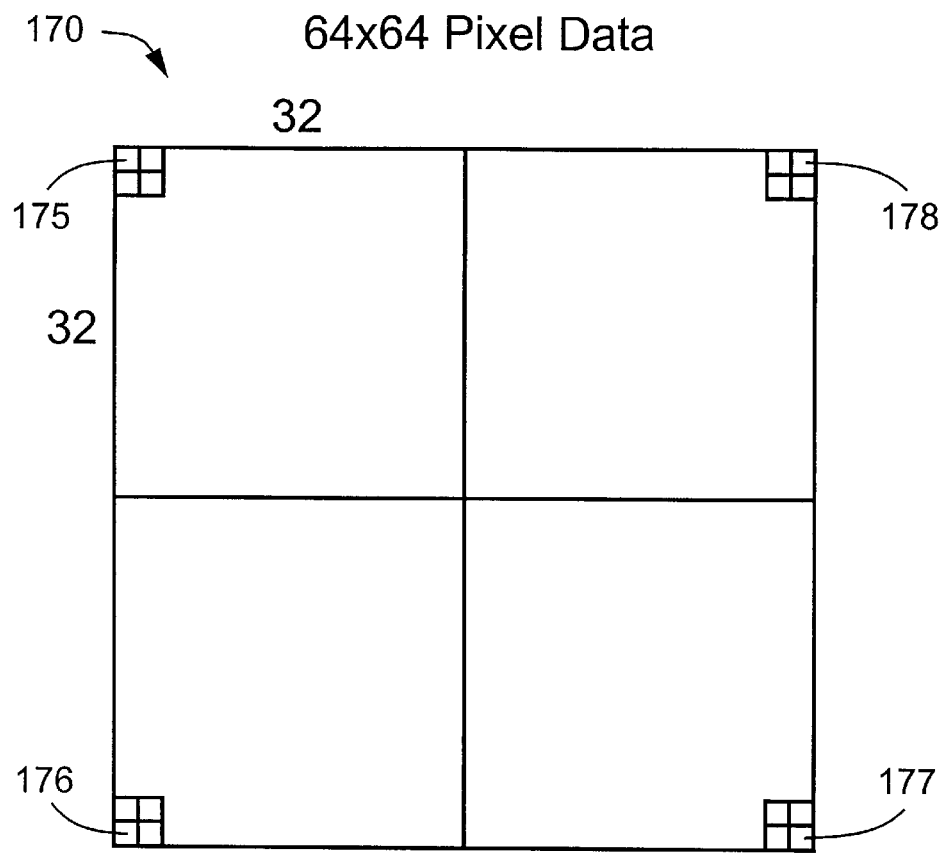
FIG. 17A is a representation of a block of pixel data retrieved from SB RAM of FIG. 11.
Figure 17B:
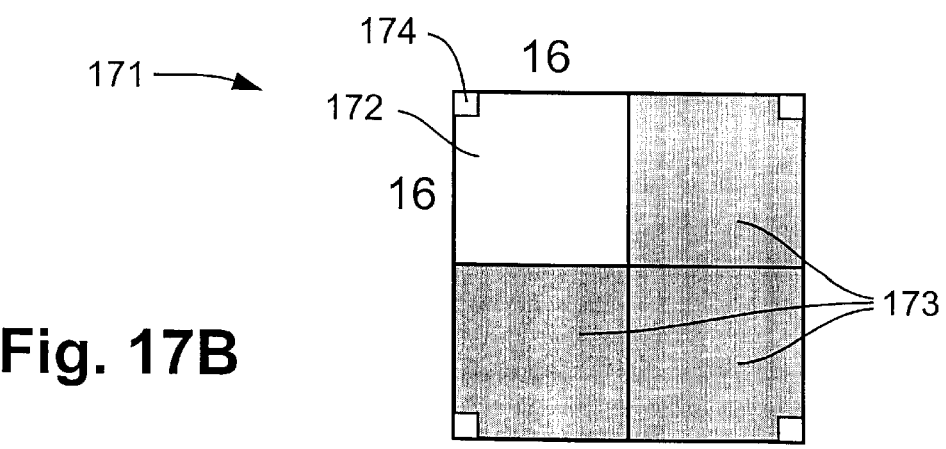
FIG. 17B is a representation of a block of a moment coefficient matrix.

Referring to FIG. 17A and FIG. 17B, there is shown a block 170 of pixel data retrieved from SB RAM 106 and a representation 171 of a moment coefficient matrix respectively. For example, a preferred block size of pixel data in the present embodiment is a 64 row×64 column block of pixels. To generate a moment value from this block a 16 row×16 column block 172 of moment coefficients is used, and therefore each moment coefficient is associated with 16 pixel values of the pixel data block 170.

In FIG. 17B there is shown a 16×16 block 172 representing one quarter (shown unshaded in FIG. 17B) of the moment coefficient matrix 171. The remaining three quarters of the moment coefficient matrix represented by shaded a block 173 indicate moment matrix coefficients which do not require storing in the matrix coefficient cache 111A because of the symmetric nature of the moment coefficient matrix as previously described. Whilst from symmetry considerations the block 172 of moment matrix coefficients will typically be associated with a corresponding 32 row×32 column pixel data block, in the preferred embodiment a high degree of accuracy in the moment value is not desired and thus a single moment matrix coefficient 174 is associated with four blocks 175, 176, 177 and 178 of four pixel data values. Thus, as previously noted, the preferred block size for the pixel data is a 64×64 block 170 which is associated with a 16×16 block 172 moment matrix coefficients. To generate a moment value the pixel values of four blocks 175, 176, 177 and 178 are accumulated and the accumulated pixel value is multiplied by an associated moment matrix coefficient 174. In a similar manner each moment matrix coefficient is multiplied by an accumulated pixel value of corresponding (or associated) blocks of four pixel values. All multiplied accumulated values are summed to produce the moment value for the block 170 of pixel data.

In effect, the 64×64 pixel data block 170 is accumulated into a 16×16 block of accumulated pixel values. Each accumulated pixel value is multiplied by a corresponding moment matrix coefficient and all multiplied results are added together to produce a moment value for the pixel data block 170.

Figure 18:
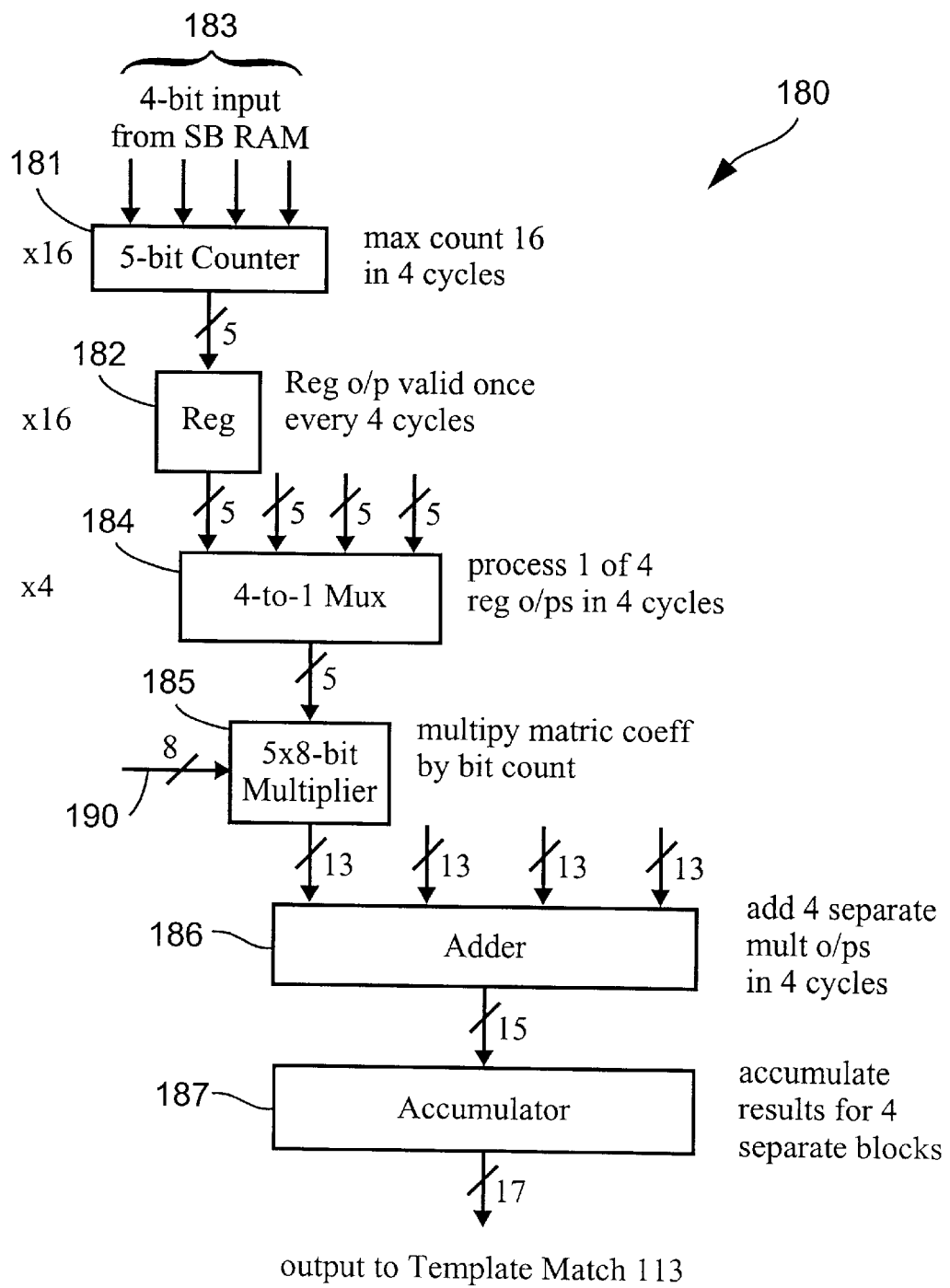
FIG. 18 is a schematic diagram of a moment calculator according to the preferred embodiment.

Referring now to FIG. 18, there is shown a schematic block diagram representation of the moment calculator 180 for determining a moment value according to the preferred embodiment. The moment calculator 180 forms part of the statistics calculator 111B of FIG. 10 and comprises a plurality of counter units 181 and corresponding register units 182 for accumulating pixel values received via input connections 183 of the counter units 181, a plurality multiplexer units 184 and corresponding number of multipliers 185, an adder unit 186, and a result accumulator unit 187.

In the preferred embodiment, input data is received from SB RAM 106 and the counter units 181 together with the corresponding register units 182 accumulates the result of 16 pixel values per counter 181 and register unit 182 combination in four clock cycles. The output of each register unit is multiplexed 184 through four multiplier units 185. Each multiplier unit 185 reads 190 an associated moment matrix coefficient from the matrix coefficient cache 111A (FIG. 10) and multiplies the associated moment coefficient with the corresponding accumulated pixel result received from the respective register unit 182. Each multiplier unit 185 outputs a partial value being an accumulated pixel result multiplied by an associated moment coefficient as previously described. The partial values from the multiplier units 185 are added together at the adder unit 186 and the partial sum from the adder unit 186 is further accumulated by a accumulator unit 187 which outputs a moment value for a 64×64 block 170 of pixel data from SB RAM. Preferably, three moment values are determined for each block 170 of pixel data retrieved from SB RAM. This is achieved by repeating the calculation described with reference to the moment calculator three times, each time using a different block of moment matrix coefficients also stored in the matrix coefficient cache 111A.

In the preferred embodiment only three complex moments for each block retrieved from SB RAM are calculated so as to minimise the memory requirements, but with the availability of greater storage space more complex moments per block are possible and desirable. Thus, three sets of coefficients are stored in the matrix coefficient cache 111A, one for each complex moment calculated. As described above the calculation involves a matrix multiplication, or its equivalent where a reduced set of coefficients are stored because of symmetry, between each set of coefficients in the lookup table (cache 111A) and the pixel data values in a block 170. The three calculated moments for the block are passed to the template matching unit 113. A next block is then retrieved and the foreground pixel count and the complex moment calculation is repeated substantially as hereinbefore described.

The template matching unit 113 (FIG. 10) receives for each block a plurality of statistical attributes: one attribute value for the dominant colour feature; a plurality of foreground pixel counts, one for each annulus; and three Zernike (complex) moments. The template matching unit 113 compares attributes passed by the statistics evaluator 111 against corresponding (data) attribute values for the known marks. The attribute values of known marks are stored in the template matching unit's associated (RAM) memory 114. The confidence values of each of the known marks (marks to be detected) are loaded at power-up (or reset) either from an external ROM or by the data supply unit.

The template matching unit 113 receives a plurality of statistical attributes that are passed from the statistics calculator 111B of FIG. 10. Each attribute passed to the template matching unit 113 is subtracted (or differenced) with a corresponding attribute value of a "known mark" to produce a difference measure for each attribute. Naturally, for more than one known mark a set of difference measures is generated for each known mark between determined attributes received from the statistics calculator 111B and corresponding attributes for each known mark.

The difference measure for each attribute is multiplied by a predetermined weight attribute factor, which enables a comparison of the difference measures between attributes. That is, since a set of difference measures are determined between the attributes determined and the attributes for each known mark, and each difference measure of the set applies to a different attribute in the set of statistical attributes a predetermined weight factor for each attribute for a mark is used to scale each difference measure so that the difference measures can be substantially compared with each other in the set. That is, the more important difference measures corresponding to the more significant attributes are scaled greater than less significant difference measures.

The weighted difference measures for each set of attributes (i.e. for each mark) are compared to each other within the set so as to determine a minimum value and a maximum value for each set.

The minimum value and maximum value for each set is used to determine a score value (total compatibility value) which is passed on to the evidence combiner 93 (FIG. 9). For example, if all the attributes determined by the statistics calculator 111B match identically with all the corresponding attributes of a known mark then all the difference measures for the set (mark) will be zero. The corresponding maximum and maximum values for the set will also be zero and the score value (total compatibility) can be determined, for example, from a predetermined value (e.g. 100) minus the difference between the maximum value and the minimum value. That is, if the predetermined value is one hundred (100) then the score value for an identical match is 100.

In practice however, the attributes are statistically determined and thus a score value from the template matching unit 113 exceeding a predetermined threshold value is taken to have provided a match between a known mark and a mark detected by the mark detector 90 (FIG. 10).

The output bandwidth of the statistics evaluator 111 is typically low, which enables the derived confidence values to be singularly compared to the corresponding confidence values for the known marks. Based on the comparison the template matching unit 113 determines a total compatibility value which is sent on to the evidence combiner 93 (FIG. 9).

The evidence combiner module 93 takes the value of total compatibility and enables or disables functions of an input device, output device or a combined input/output device such as a photocopier in accordance with a thresholding criteria on the total compatibility value. For example the functions may include the prevention of copying, the sounding of a warning or the shutting down of the device in which the present invention is installed.

Figure 19:
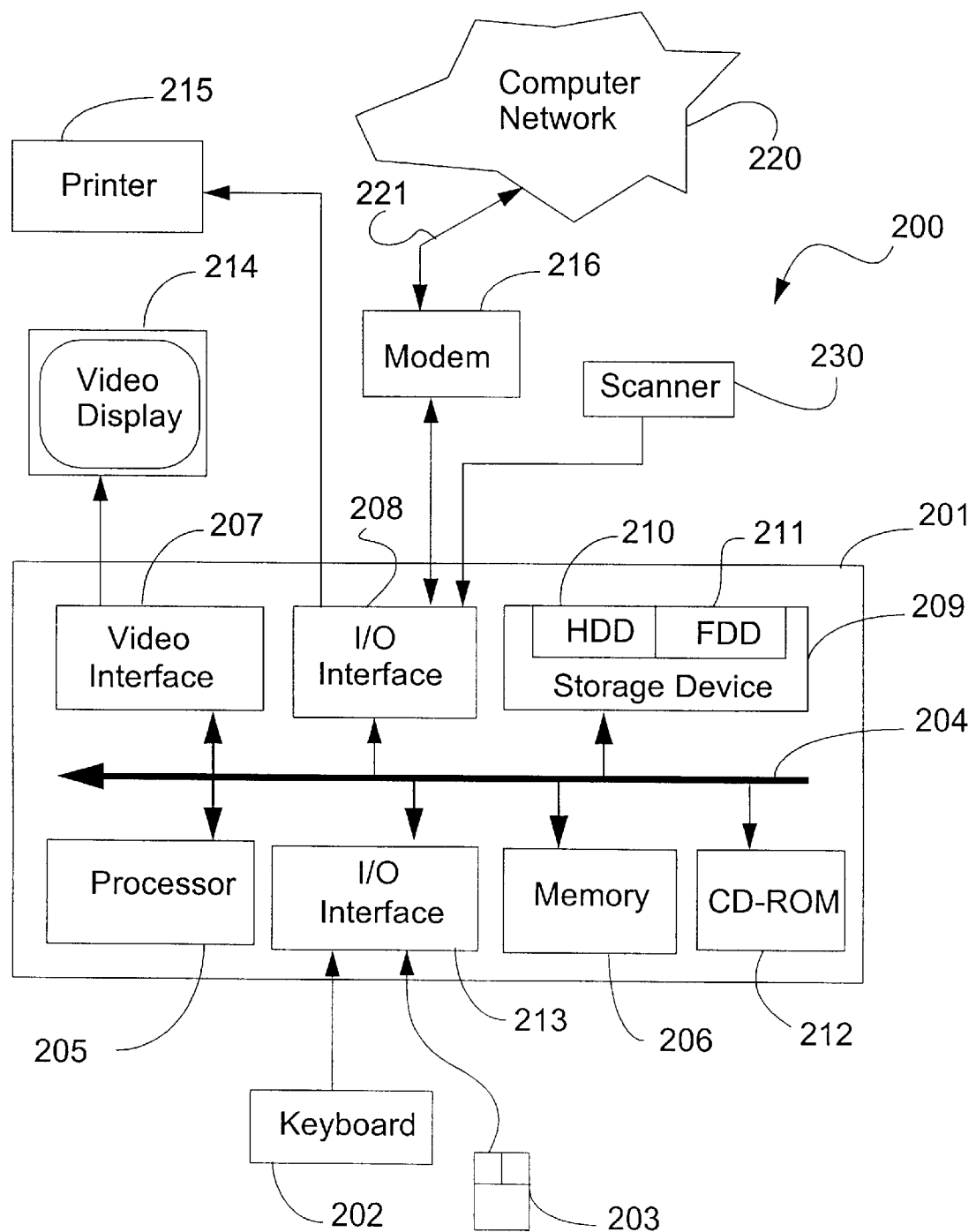
FIG. 19 is a schematic block diagram representation of a computer system in which an embodiment of the present invention may be performed.

The detection method performed by the apparatus of FIGS. 2 to 18 may alternatively be performed using a conventional general-purpose computer system 200, such as that shown in FIG. 19 wherein the processes of FIGS. 2 to 18 may be implemented as software, such as an application program executing within the computer system 200. In particular, the detection method is effected by instructions in the software that are carried out by the computer. The software may be divided into two separate parts; one part for carrying out the detection method, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for pattern detection in accordance with the embodiments of the invention.

The computer system 200 comprises a computer module 201, input devices such as a keyboard 202 and mouse 203, output devices including a printer 215 and a display device 214. A scanner 230 is also provided to act as source of image data. A modulator-demodulator (modem) transceiver device 216 is used by the computer module 201 for communicating to and from a communications network 220, for example connectable via a telephone line 221 or other functional medium. The modem 216 can be used to obtain access to the Internet, and other network systems, such as a Local Area Network (LAN) or a Wide Area Network (WAN), thereby acting as an alternate source of image data.

The computer module 201 typically includes at least one processor unit 205, a memory unit 206, for example formed from semiconductor random access memory (RAM) and read only memory (ROM), input/output (I/O) interfaces including a video interface 207, and an I/O interface 213 for the keyboard 202 and mouse 203 and optionally a joystick (not illustrated), and an interface 208 for the modem 216. A storage device 209 is provided and typically includes a hard disk drive 210 and a floppy disk drive 211. A magnetic tape drive (not illustrated) may also be used. A CD-ROM drive 212 is typically provided as a non-volatile source of data. The components 205 to 213 of the computer module 201, typically communicate via an interconnected bus 204 and in a manner which results in a conventional mode of operation of the computer system 200 known to those in the relevant art. Examples of computers on which the embodiments can be practised include IBM-PC's and compatibles, Sun Sparc-stations or alike computer systems evolved therefrom.

Typically, the application program of the preferred embodiment is resident on the hard disk drive 210 and read and controlled in its execution by the processor 205. Intermediate storage of the program and any data fetched from the scanner 230 or network 220 may be accomplished using the semiconductor memory 206, possibly in concert with the hard disk drive 210. In some instances, the application program may be supplied to the user encoded on a CD-ROM or floppy disk and read via the corresponding drive 212 or 211, or alternatively may be read by the user from the network 220 via the modem device 216. Still further, the software can also be loaded into the computer system 200 from other computer readable medium including magnetic tape, a ROM or integrated circuit, a magneto-optical disk, a radio or infra-red transmission channel between the computer module 201 and another device, a computer readable card such as a PCMCIA card, and the Internet and Intranets including e-mail transmissions and information recorded on websites and the like. The foregoing is merely exemplary of relevant computer readable mediums. Other computer readable media may be practiced without departing from the scope and spirit of the invention.

INDUSTRIAL APPLICABILITY

The embodiments of the invention are applicable to the authentication of documents through marking or to enable tracking of marked documents that may be reproduced.

The foregoing describes only some embodiments of the present invention, and modifications and/or changes can be made thereto without departing from the scope and spirit of the invention, the embodiments being illustrative and not restrictive.

We claim:

1. A method of detecting a predetermined mark forming part of an image, said method comprising:
a provide step of providing a digitized form of the image comprising a plurality of picture elements;
a feature determination step of determining within a current region of the image a set of features comprising at least
a dominant color feature, and
at least one moment feature based on picture elements pertaining to the predetermined mark;
a comparison step of comparing each determined feature with a corresponding predetermined feature of the predetermined mark;
a calculation step of calculating, using a result from said comparison step, a confidence level for detecting the predetermined mark within the current region; and
a mark determination step of determining, based on the confidence level calculated in said calculation step, whether the predetermined mark is detected in the current region.

2. A method according to claim 1, wherein said feature determination step includes determining a number of picture elements within the current region not pertaining to the predetermined mark.

3. A method according to claim 1, wherein said comparison step further includes establishing a threshold for each determined feature using a predetermined threshold value.

4. A method according to claim 3, wherein the set of features determined in said feature determination step comprises a range of feature values for each determined feature and the corresponding predetermined threshold value.

5. A method according to claim 1, further comprising a selection step of
selecting a new region of the image as the current region, wherein said feature determination step, said comparison step, said calculation step, and said mark determination step are performed on the new region.

6. A method according to claim 5, wherein selection of the new region comprises a detection step of detecting a center location of a predetermined pattern in the image, and said detection step includes the sub-steps of:
examining a plurality of pixel values at predetermined pixel locations within the image, the predetermined pixel locations being determined by a plurality of groups comprising multiple locations in each group and the groups being configured into a predetermined geometric arrangement having a corresponding geometric center location;
determining an evidence value for each group of examined pixel values;
determining a deviation measure value from the evidence values of substantially all the groups of the geometric arrangement; and
establishing a threshold of the deviation measure value against a predetermined threshold value and outputting a center value, indicating a pixel location corresponding to the center location, if the deviation value for each group is below the predetermined threshold value, or otherwise outputting an invalid value.

7. A method according to claim 1, wherein determining at least one moment feature includes the sub-steps of:
storing a predetermined subset of coefficient values of a moment matrix, wherein the moment matrix has a predetermined symmetry and the predetermined subset of coefficient values being those coefficient values which exploit at least part of the predetermined symmetry;
combining picture element values at selected locations in the current region to provided a combined result, wherein the selected locations are associated with a respective coefficient value of the predetermined subset of coefficient values;
multiplying each combined result with a corresponding coefficient value; and
accumulating each multiplied combined result to determine a moment feature of the current region.

8. An apparatus for detecting a predetermined mark forming part of an image, said apparatus comprising:
input means for providing a region of the image, wherein the image comprises a plurality of pixels and the predetermined mark is distinguishable by a specified pixel arrangement of predetermined colors;
feature determining means for determining within a current region of the image a set of features comprising at least
a dominant color feature, and
at least one moment feature based on the pixels having one of the predetermined colors of the current region; and
comparison means for comparing each determined feature with a corresponding predetermined feature of the predetermined mark;
calculation means for calculating, using a result from said comparison means, a confidence value for detecting the predetermined mark within the current region; and
mark determining means for determining, based on the confidence value calculated by said calculation means, whether the predetermined mark is detected in the current region.

9. An apparatus according to claim 8, wherein the feature determining means further determines a total number of pixels having one of the predetermined colors of the current region.

10. A computer readable medium, having a program recorded thereon, where said program is configured to make a computer execute a method to detect a predetermined mark forming part of an image, wherein the image comprises a plurality of pixels and the predetermined mark is distinguishable by a specified pixel arrangement of predetermined colors, said program comprising:
code for a provide step of providing a digitized form of the image comprising a plurality of picture elements;
code for a feature determination step of determining within a current region of the image a set of features comprising at least
a dominant color feature, and
at least one moment feature based on picture elements pertaining to the predetermined mark;
code for a comparison step of comparing each determined feature with a corresponding predetermined feature of the predetermined mark;
code for a calculation step of calculating, using a result from said comparison step, a confidence level for detecting the predetermined mark within the current region; and
code for a mark determination step of determining, based on the confidence level, whether the predetermined mark is detected in the current region.

11. A computer readable medium according to claim 10, wherein said feature determination step includes determining a number of picture elements within the current region not pertaining to the predetermined mark.

12. A computer readable medium according to claim 10, wherein said comparison step includes establishing a threshold for each determined feature using a predetermined threshold value.

13. A computer readable medium according to claim 10, wherein said feature determining step includes determining a total number of pixels having one of the predetermined colors of the current region.

14. A computer program element comprising computer program code means to make a computer execute a method to detect a predetermined mark forming part of an image, said computer code means comprising:
- code for a provide step of providing a digitized form of the image comprising a plurality of picture elements;
- code for a feature determining step of determining within a current region of the image a set of features comprising at least
  - a dominant color feature, and
  - at least one moment feature based on picture elements pertaining to the predetermined mark; and
- code for a comparison step of comparing each determined feature with a corresponding predetermined feature of the predetermined mark;
- code for a calculation step of calculating, using a result from said comparison step, a confidence level for detecting the predetermined mark within the current region; and
- code for a mark determination step of determining, based on the confidence level calculated in said calculation step, whether the predetermined mark is detected in the current region.

15. A system for detecting a predetermined mark forming part of an image, said system comprising:
- memory for storing at least a portion of a digitized form of the image comprising a plurality of picture elements and for storing predetermined features of the predetermined mark; and
- a processor coupled to said memory, wherein said processor is programmed to perform:
  - determining, within a current region of the image, a set of features comprising at least a dominant color and at least one moment feature based on picture elements pertaining to the predetermined mark,
  - comparing each determined feature with a corresponding one of the predetermined features,
  - calculating, using a result from the comparing, a confidence level for detecting the predetermined mark within the current region, and
  - determining, based on the confidence level, whether or not the predetermined mark is detected in the current region.

* * * * *

UNITED STATES PATENT AND TRADEMARK OFFICE
CERTIFICATE OF CORRECTION

PATENT NO.   : 6,766,056 B1  
DATED        : July 20, 2004  
INVENTOR(S)  : Kai Huang et al.

Page 1 of 6

It is certified that error appears in the above-identified patent and that said Letters Patent is hereby corrected as shown below:

Column 1,  
Line 5, "FIELD" should read -- BACKGROUND OF THE INVENTION ¶ FIELD --;  
Lines 15, 37 and 54, "colour" should read -- color --;  
Line 26, "a" should read -- at --;  
Line 58, "provides" should read -- provided --; and  
Line 66, "colour code" should read -- color code --; and "colour value" should read -- color value --.

Column 2,  
Line 2, "representation" should read -- representation of --;  
Line 4, "colour" should read -- color --;  
Lines 8, 25 and 26, "centre" should read -- center --;  
Line 17, "tre" should read -- ter --;  
Line 55, "drawings" should read -- drawings of --; and  
Line 61, "FIG. 3" should read -- FIG. 3 is --; and "accordance" should read -- accordance with --.

Column 3,  
Lines 6, 48, 49 and 57, "colour" should read -- color --;  
Line 16, "centre" should read -- center --; and  
Line 50, "Colour" should read -- Color --.

Column 4,  
Lines 1, 2, 4, 5, 10, 11, 19 and 59, "colour" should read -- color --;  
Line 21, "colour encoded" should read -- color encoded --; and "colour coded" should read -- color coded --;  
Line 26, "(colour)" should read -- (color) --; and "colour" should read -- color --; and  
Lines 48, 60, 62 and 66, "colours" should read -- colors --.

Column 5,  
Lines 3, 9 and 17, "colours" should read -- colors --;  
Lines 7 and 61, "colour" should read -- color --;  
Line 21, "if" should read -- is --;  
Line 24, "colour." should read -- color. --; and  
Line 41, "duplication" should read -- duplication of --.

Column 6,  
Lines 4, 6, 17 and 36, "colour" should read -- color --;  
Line 23, "(H-signal) 51" should read -- (H-signal) 50 --; and "single" should read -- signal --;

UNITED STATES PATENT AND TRADEMARK OFFICE
CERTIFICATE OF CORRECTION

PATENT NO. : 6,766,056 B1
DATED : July 20, 2004
INVENTOR(S) : Kai Huang et al.

It is certified that error appears in the above-identified patent and that said Letters Patent is hereby corrected as shown below:

Column 6 (cont'd),
Line 28, "require" should read -- required --;
Line 40, "signal 45" should read -- signal 48 --;
Line 59, "label" should read -- labeled --;
Lines 60, 61 and 64, "labelled" should read -- labeled --; and
Line 65, "(labelled" should read -- (labeled --.

Column 7,
Lines 3, 8 and 9, "labelled" should read -- labeled --;
Lines 14, 16, 50 and 52, "colour" should read -- color --;
Line 20, "determined" should read -- determine --;
Line 22, "colour." should read -- color. --; "foreground colour" should read
-- foreground color --; and "a colour" should read -- a color --;
Lines 23 and 58, "colours," should read -- colors, --;
Line 24, "colours" should read -- colors --; and "term" should read -- termed --;
Lines 25 and 64, "colours." should read -- colors. --;
Line 26, "colours" should read -- colors --; "colour" should read -- color --; and
"a colour" should read -- a color --;
Lines 29, 30 and 56, "colours" should read -- colors --;
Line 32, "colour" should read -- color --; and "colours" should read -- colors --;
Line 36, "whether" should read -- to determine whether --;
Line 54, "of colours" should read -- of colors --; and "those colours" should read
-- those colors --;
Line 55, "colour," should read -- color, --; and "colour" should read -- color --;
Line 57, "colour." should read -- color. --;
Line 59, "the colour" should read -- the color --; and "foreground colour" should read
-- foreground color is --;
Line 60, "being" should be deleted; and "colour" should read -- color is assigned --; and
Line 65, "in" should read -- is --.

Column 8,
Lines 2, 6, 7, 9, 10, 11, 12, 14 and 16, "colour" should read -- color --;
Line 5, "colour," should read -- color, --;
Line 15, "input" should read -- the input --; and "unit 44" should read -- unit 44, --;
Line 32, "count" should read -- counts --;
Line 35, "at" should be deleted;
Lines 36, 40 and 42, "repeat" should read -- repeats --;
Line 37, "locations" should read -- location, --;
Line 50, "is" should read -- in --;
Line 52, "location" should read -- locations --;

UNITED STATES PATENT AND TRADEMARK OFFICE
CERTIFICATE OF CORRECTION

PATENT NO. : 6,766,056 B1
DATED : July 20, 2004
INVENTOR(S) : Kai Huang et al.

It is certified that error appears in the above-identified patent and that said Letters Patent is hereby corrected as shown below:

Column 8 (cont'd),
Line 55, "value," should read -- values, --;
Line 59, "value" should read -- values --; and
Line 67, "recognise" should read -- recognize --.

Column 9,
Lines 7, 8, 10, 18, 25, 28, 32, 33, 35, 38, 42, 44, 45 and 55, "colour" should read -- color --;
Line 14, "determine" should read -- determined --;
Line 16, "colours," should read -- colors, --; and "colours" should read -- colors --;
Line 17, "colour," should read -- color, --;
Lines 19 and 23, "colours" should read -- colors --;
Line 20, "colour." should read -- color. --; and "colour," should read -- color, --;
Line 22, "colour." should read -- color. --;
Line 24, "colours" should read -- colors --; and "colour" should read -- color --;
Line 57, "detail" should read -- detailed --; and
Line 66, "centre" should read -- center --.

Column 10,
Line 9, "check" should read -- checked --; and "coloured" should read -- colored --;
Line 10, "coloured" should read -- colored --;
Line 27, "centre." should read -- center. --;
Lines 28, 39, 43, 44, 45, 51, 53 and 56, "centre" should read -- center --;
Line 34, "that" should read -- than --;
Lines 42, 48, 52 and 58, "centres" should read -- centers --;
Line 47, "centres" should read -- centers --; "single centre" should read -- single center --; and "The centre" should read -- The center --;
Line 50, "each centre" should read -- each center --; and "centre having" should read -- center having --;
Line 54, "form" should read -- from --; and "centres" should read -- centers --;
Line 59, "centre" should read -- center --; and "centres" should read -- centers --; and
Line 62, "centre" should read -- center --; and "centre)" should read -- center) --.

Column 11,
Line 7, "step 65" should read -- step 66 --;
Line 9, "colour in of" should read -- color in --;
Lines 16, 17, 48, 52, 53, 60, 61, 62 and 63, "colour" should read -- color --;
Line 21, "number" should read -- number of --;
Line 46, "colour" should read -- color--; and "At each" should read -- Each --;
Line 55, "centre" should read -- center --; and
Line 58, "centre." should read -- center. --.

UNITED STATES PATENT AND TRADEMARK OFFICE
CERTIFICATE OF CORRECTION

PATENT NO. : 6,766,056 B1
DATED : July 20, 2004
INVENTOR(S) : Kai Huang et al.

It is certified that error appears in the above-identified patent and that said Letters Patent is hereby corrected as shown below:

Column 12,
Line 9, "$A_m$" should read -- $A_{nm}$ --;
Line 23, "n– | m | is even and" should be deleted;
Line 48, "know" should read -- known --; and
Line 52, "determined," should read -- determine, --.

Column 13,
Table 1, line 10, "colour" should read -- color --;
Table 1, line 11, "colour" should read -- color --;
Table 1, line 12, "colour" should read -- color --;
Line 47, "a colour" should read -- a color --; and "associated colour" should read -- associated color --; and
Lines 50 and 65, "centre" should read -- center --.

Column 14,
Line 42, "utilises" should read -- utilizes --;
Line 45, "centre" should read -- center --;
Lines 46 and 50, "centre." should read -- center. --;
Line 48, "centre" should read -- center --; and "centre." should read -- center. --;
Line 50, "centre." should read -- center. --; and
Line 62, "labelled" should read -- labeled --.

Column 15,
Line 14, "initialisation," should read -- initialization, --;
Lines 43 and 48, "centre" should read -- center --;
Line 44, "centre." should read -- center. --;
Line 55, "labelled" should read -- labeled --;
Line 56, "sets" should read -- set --; and
Line 61, "intersect" should read -- intersects --.

Column 16,
Lines 41, 43, 46, 47, 50, 54, 58 and 62, "centre" should read -- center --.

Column 17,
Lines 1, 3, 11, 12, 18, 20, 39, 41, 44 and 67, "centre" should read -- center --;
Line 5, "centres" should read -- centers --; and "centre" should read -- center --;
Line 6, "centre")" should read -- center") --;
Lines 7, 9 and 10, "centres" should read -- centers --;
Line 8, "remove. The centre" should read -- removed. The center --;
Lines 13 and 16, "centre." should read -- center. --; and "centre" should read -- center --;

UNITED STATES PATENT AND TRADEMARK OFFICE
CERTIFICATE OF CORRECTION

PATENT NO. : 6,766,056 B1
DATED : July 20, 2004
INVENTOR(S) : Kai Huang et al.

It is certified that error appears in the above-identified patent and that said Letters Patent is hereby corrected as shown below:

Column 17 (cont'd),
Line 17, "utilises" should read -- utilizes --; and "centre" should read -- center --;
Line 23, "centre of" should read -- center of --; and "the centre" should read -- the center --;
Line 24, "centre," should read -- center, --; and
Line 33, "utilising" should read -- utilizing --.

Column 18,
Lines 1, 29, 31, 44, 55 and 67, "centre" should read -- center --;
Lines 4, 5, 6, 13, 22, 25, 26, 27, 36, 40 and 47, "colour" should read -- color --;
Lines 10 and 43, "colour." should read -- color. --;
Line 11, "centred" should read -- centered --;
Line 12, "centre" should read -- center--; and "colour" should read -- color --;
Line 19, "require" should read -- required --;
Line 39, "colours." should read -- colors. --;
Line 42, "attributes," should read -- attribute, --;
Line 45, "centre in" should read -- center is --; and
Line 54, "centred" should read -- centered --; and "centre" should read -- center --.

Column 19,
Lines 3 and 5, "centre" should read -- center --;
Line 23, "practise" should read -- practice --; and
Line 38, "by shaded a" should read -- by a shaded --.

Column 20,
Line 6, "plurality" should read -- plurality of --;
Line 24, "a" should read -- an --;
Line 35, "minimise" should read -- minimize --; and
Line 51, "colour" should read -- color --.

UNITED STATES PATENT AND TRADEMARK OFFICE
CERTIFICATE OF CORRECTION

PATENT NO. : 6,766,056 B1
DATED : July 20, 2004
INVENTOR(S) : Kai Huang et al.

It is certified that error appears in the above-identified patent and that said Letters Patent is hereby corrected as shown below:

Column 22,
Line 34, "practised" should read -- practiced --.

Signed and Sealed this

Eleventh Day of October, 2005

JON W. DUDAS
*Director of the United States Patent and Trademark Office*